United States Patent
Inoue

(10) Patent No.: US 10,421,044 B2
(45) Date of Patent: Sep. 24, 2019

(54) COMPOSITE ANION EXCHANGE MEMBRANE, METHOD FOR PRODUCING THE SAME, ION EXCHANGE MEMBRANE MODULE, AND ION EXCHANGE DEVICE

(71) Applicant: FUJIFILM Corporation, Tokyo (JP)

(72) Inventor: Kazuomi Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 115 days.

(21) Appl. No.: 15/669,967

(22) Filed: Aug. 7, 2017

(65) Prior Publication Data

US 2017/0333846 A1   Nov. 23, 2017

Related U.S. Application Data

(63) Continuation of application No. PCT/JP2016/051492, filed on Jan. 20, 2016.

(30) Foreign Application Priority Data

Feb. 19, 2015 (JP) ................................. 2015-030741

(51) Int. Cl.

| | | |
|---|---|---|
| B01D 61/46 | (2006.01) |
| B01J 41/14 | (2006.01) |
| B01J 47/12 | (2017.01) |
| B01D 71/40 | (2006.01) |
| B01D 67/00 | (2006.01) |
| B01D 69/02 | (2006.01) |
| B01D 71/52 | (2006.01) |
| B01D 71/56 | (2006.01) |
| B01D 71/76 | (2006.01) |
| B01J 41/04 | (2017.01) |
| B01D 71/82 | (2006.01) |
| B01D 69/12 | (2006.01) |
| C08J 5/22 | (2006.01) |

(52) U.S. Cl.
CPC ......... *B01D 61/46* (2013.01); *B01D 67/0006* (2013.01); *B01D 69/02* (2013.01); *B01D 69/125* (2013.01); *B01D 71/40* (2013.01); *B01D 71/52* (2013.01); *B01D 71/56* (2013.01); *B01D 71/76* (2013.01); *B01D 71/82* (2013.01); *B01J 41/04* (2013.01); *B01J 41/14* (2013.01); *B01J 47/12* (2013.01); *C08J 5/2231* (2013.01); *B01D 2323/30* (2013.01); *B01D 2323/345* (2013.01); *B01D 2325/26* (2013.01); *B01D 2325/42* (2013.01); *C08J 2333/14* (2013.01); *C08J 2333/26* (2013.01); *C08J 2433/14* (2013.01); *C08J 2433/26* (2013.01)

(58) Field of Classification Search
CPC ........ B01D 61/46; B01D 71/40; B01D 71/52; B01D 71/56; B01D 71/76; B01D 67/0006; B01D 69/02; B01D 69/126; B01J 41/14; B01J 41/04; B01J 47/12; C08J 5/2231
USPC .......................................................... 521/27
See application file for complete search history.

(56) References Cited

FOREIGN PATENT DOCUMENTS

| JP | 03115440 A | * | 5/1991 | |
|---|---|---|---|---|
| JP | H03115440 | | 5/1991 | |
| JP | H07265863 | | 10/1995 | |
| JP | 10330510 A | * | 12/1998 | |
| JP | H10330510 | | 12/1998 | |
| JP | 2007051297 | | 3/2007 | |
| JP | 2007051297 A | * | 3/2007 | |
| JP | 2008007545 | | 1/2008 | |
| JP | 2009013477 | | 1/2009 | |
| JP | 2011072860 | | 4/2011 | |
| JP | 2012196625 | | 10/2012 | |
| JP | 2012196625 A | * | 10/2012 | |
| JP | 2014201612 | | 10/2014 | |
| JP | 2014201612 A | * | 10/2014 | ............ C08F 220/54 |

OTHER PUBLICATIONS

"Written Opinion of the International Searching Authority (Form PCT/ISA/237)" of PCT/JP2016/051492, dated Apr. 19, 2016, with English translation thereof, pp. 1-9.
"International Search Report (Form PCT/ISA/210) of PCT/JP2016/051492", dated Apr. 19, 2016, with English translation thereof, pp. 1-5.

* cited by examiner

*Primary Examiner* — Michael Bernshteyn
(74) *Attorney, Agent, or Firm* — JCIPRNET

(57) ABSTRACT

The composite anion exchange membrane includes: a surface layer on a single surface or both surfaces of an anion exchange membrane substrate, in which the above-described surface layer contains a copolymer of a monomer A which is a water-soluble polyfunctional monomer and a monomer B which is a cationic monomer, an anion exchange capacity of the above-described surface layer is 0.05 meq/cm$^3$ to 0.50 meq/cm$^3$, and an anion exchange capacity of the above-described anion exchange membrane substrate is 1.0 meq/cm$^3$ to 5.0 meq/cm$^3$.

19 Claims, 1 Drawing Sheet

COMPOSITE ANION EXCHANGE MEMBRANE, METHOD FOR PRODUCING THE SAME, ION EXCHANGE MEMBRANE MODULE, AND ION EXCHANGE DEVICE

CROSS-REFERENCE TO RELATED APPLICATIONS

This application is a Continuation of PCT International Application No. PCT/JP2016/051492 filed on Jan. 20, 2016, which claims priority under 35 U.S.C § 119 (a) to Japanese Patent Application No. 2015-030741 filed on Feb. 19, 2015. Each of the above application(s) is hereby expressly incorporated by reference, in its entirety, into the present application.

BACKGROUND OF THE INVENTION

1. Field of the Invention

The present invention relates to a composite anion exchange membrane, a method for producing the same, an ion exchange membrane module, and an ion exchange device.

2. Description of the Related Art

Ion exchange membranes are used for electrodeionization (EDI), continuous electrodeionization (CEDI), electrodialysis (ED), electrodialysis reversal (EDR), and the like.

Electrodeionization (EDI) is a water treatment process in which ions are removed from an aqueous liquid using an ion exchange membrane and potential in order to achieve ion transport. Unlike other water purification techniques such as an ion exchange in the related art, it is possible to use the process in order to produce ultrapure water without using any chemical agents such as an acid or a caustic soda. Electrodialysis (ED) and electrodialysis reversal (EDR) are electrochemical separation processes of removing ions or the like from water and other fluids.

Ion exchange membranes disclosed in JP2009-13477A, JP2008-007545A, and JP1995-265863A (JP-H07-265863A) are known as ion exchange membranes in the related art.

In JP2009-13477A, a method for producing quaternary ammonium hydroxide by performing electrolysis through supplying an aqueous solution of halogenated quaternary ammonium salts to a chamber divided by an anion exchange membrane and a cation exchange membrane in an electrolytic bath formed by arranging the anion exchange membrane and the cation exchange membrane between electrodes, in which a membrane formed of a substrate layer and a surface cross-linked layer that is formed on the surface of the above-described substrate layer on one side is used as the above-described anion exchange membrane and electrolysis is performed by arranging the above-described anion exchange membrane such that a surface layer is positioned on an anode side.

In JP2008-007545A, a composite anion exchange membrane comprising: an anion exchange membrane and a polyanion layer which is fixed to the surface of the above-described anion exchange membrane, in which the above-described polyanion layer is formed of an anionic polymer of which the number average molecular weight is within a range of greater than or equal to 4,000 in terms of polystyrene and in which a desorption ability R of the polyanion layer represented by Formula: $R=(A-B)/A \times 100$ (in Formula, A represents an amount (meq/g) of the anionic polymer existing on the surface of the membrane when starting the energization per anion exchange membrane unit weight and B represents an amount (meq/g) of the anionic polymer existing on the surface of the membrane after the completion of the above-described energization per anion exchange membrane unit weight) is less than or equal to 20% when the energization is performed for one hour at a current density of 10 $mA/cm^2$ in a direction in which anions are desorbed in a state where the polyanion layer is immersed in a 0.1 N sodium chloride aqueous solution kept at a temperature of 25° C. is disclosed.

In JP1995-265863A (JP-H07-265863A), a method for removing nitrate ions in which anion exchange membranes are arranged by setting a side that has a thin layer as a desalting chamber side using membranes having a thin layer of a negative charge with a thickness of 10 angstrom to 5 μm on the surface of the membranes, as the anion exchange membranes, when removing the nitrate ions from an aqueous solution containing the nitrate ions through electrodialysis, is disclosed.

SUMMARY OF THE INVENTION

According to the method in JP2009-13477A, there are problems in that the cross-linking density of the surface layer is high and the transmission of monovalent ions is also suppressed, and therefore, the electric resistance of the membrane increases and energy consumption during electrodialysis increases.

According to the method in JP2008-007545A, there are problems in that the ion exchange capacity of the surface layer is large, and therefore, transmission of divalent ions cannot be suppressed and selective permeability of monovalent ions is insufficient.

In a case where a charge repellent layer is provided in order to selectively transmit monovalent ions as in the method in JP1995-265863A (JP-H07-265863A), the transmission of the monovalent ions is also suppressed, and therefore, the electric resistance of the membranes increases and the energy consumption during electrodialysis increases.

An object of the present invention is to provide a composite anion exchange membrane which has excellent selective permeability of monovalent ions and of which energy consumption is suppressed, a method for producing the same, an ion exchange membrane module in which the above-described composite anion exchange membrane is used, and an ion exchange device.

The above-described problems of the present invention are solved by means described in the following <1>, <8>, <12>, or <13> which will be described below together with <2> to <7> and <9> to <11> which are preferable embodiments.

<1> A composite anion exchange membrane comprising:
an anion exchange membrane substrate; and a surface layer which is provided on a single surface or both surfaces of the above-described anion exchange membrane substrate, in which the above-described surface layer contains a copolymer of a monomer A which is a water-soluble polyfunctional monomer and a monomer B which is a cationic monomer, an anion exchange capacity of the above-described surface layer is 0.05 $meq/cm^3$ to 0.50 $meq/cm^3$, and an anion exchange capacity of the above-described anion exchange membrane substrate is 1.0 $meq/cm^3$ to 5.0 $meq/cm^3$.

<2> The composite anion exchange membrane <1>, in which the monomer A is a monomer having an ethylene glycol chain or a monomer having a polyethylene glycol chain, and the monomer B is a monomer having a quaternary ammonium group.

<3> The composite anion exchange membrane according to <2>, in which the above-described monomer having a quaternary ammonium group is a (meth)acrylate compound or a (meth)acrylamide compound.

<4> The composite anion exchange membrane according to <2> or <3>, in which the above-described monomer having an ethylene glycol chain or the above-described monomer having a polyethylene glycol chain is a (meth) acrylate compound or a (meth)acrylamide compound.

<5> The composite anion exchange membrane according to any one of <2> to <4>, in which the above-described monomer having an ethylene glycol chain or the above-described monomer having a polyethylene glycol chain is polyethylene glycol diacrylate having a repeating number of ethylene glycol of 8 to 25.

<6> The composite anion exchange membrane according to any one of <1> to <5>, in which the above-described surface layer is a polymer of a surface layer forming composition which contains the monomer A, the monomer B, and a photopolymerization initiator represented by the following Formula PI-1.

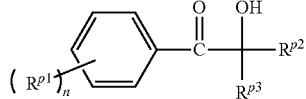

(PI-1)

In Formula PI-1, $R^{p1}$ represents an alkyl group, an alkenyl group, an alkoxy group, or an aryloxy group, $R^{p2}$ and $R^{p3}$ each independently represent a hydrogen atom, an alkyl group, an alkenyl group, an alkoxy group, or an aryloxy group, $R^{p2}$ and $R^{p3}$ may be bonded to each other to form a ring, and n represents an integer of 0 to 5.

<7> The composite anion exchange membrane according to any one of <1> to <6>, in which the above-described surface layer is a polymer of a surface layer faulting composition which contains the monomer A and the monomer B and of which a molar ratio containing the monomer A and the monomer B is monomer A:monomer B=98:2 to 85:15.

<8> A method for producing a composite anion exchange membrane, comprising: a coating a single surface or both surfaces of an anion exchange membrane substrate with a surface layer forming composition; and forming a surface layer by polymerizing the above-described coated surface layer forming composition, in which an anion exchange capacity of the above-described surface layer is 0.05 meq/cm$^3$ to 0.50 meq/cm$^3$, and an anion exchange capacity of the above-described anion exchange membrane substrate is 1.0 meq/cm$^3$ to 5.0 meq/cm$^3$.

<9> The method for producing a composite anion exchange membrane according to <8>, in which the above-described surface layer forming composition contains a monomer having an ethylene glycol chain or a monomer having a polyethylene glycol chain, and a monomer having a quaternary ammonium group.

<10> The method for producing a composite anion exchange membrane according to <8> or <9>, in which the above-described polymerization of the coated surface layer forming composition is performed through photopolymerization.

<11> The method for producing a composite anion exchange membrane according to any one of <8> to <10> wherein a method for producing a composite anion exchange membrane that is used for removing nitrate ions.

<12> An ion exchange membrane module comprising: the composite anion exchange membrane according to any one of <1> to <7>.

<13> An ion exchange device comprising: the composite anion exchange membrane according to any one of <1> to <7>.

According to the present invention, it is possible to provide a composite anion exchange membrane which has excellent selective permeability of monovalent ions and of which energy consumption is suppressed, a method for producing the same, an ion exchange membrane module in which the above-described composite anion exchange membrane is used, and an ion exchange device.

DESCRIPTION OF THE PREFERRED EMBODIMENTS

Figure 1:
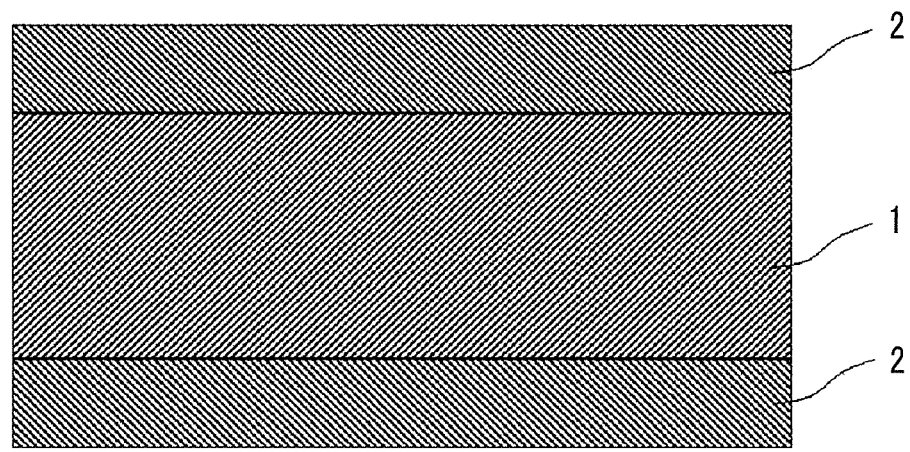
FIG. 1 is a schematic cross-sectional view showing an example of a composite anion exchange membrane of the present invention.

Hereinafter, the details of the present invention will be described. While the description of the constitutional requirements, which will be described below, is based on the representative embodiments of the present invention, the present invention is not limited to such embodiments. In the present specification, the expression "to" is used as a meaning of including numerical values denoted before and after "to" as a lower limit value and an upper limit value.

In the notation of groups (atomic groups) in the present specification, a notation having no description of substitution and non-substitution also contains no inclusion of a substituent and inclusion of a substituent. For example, an "alkyl group" includes an alkyl group (substituted alkyl group) having a substituent as well as an alkyl group (unsubstituted alkyl group) having no substituent.

Furthermore, a geometrical isomer which is a substitution pattern of a double bond in each formula may be, unless otherwise specified, an E-form, a Z-form, and a mixture thereof even if one of the isomers is described for the convenience of the description.

In addition, in some cases, chemical structural formulas in the present specification are described using a simplified structural formula in which a hydrogen atom is omitted.

In the present specification, "(meth)acrylate" represents acrylate and methacrylate, "(meth)acryl" represents acrylic and methacrylic, "(meth)acryloyl" represents acryloyl and methacryloyl, and "(meth)acrylamide" represents acrylamide and methacrylamide.

In addition, in the present invention, "mass %" and "wt %" are synonymous to each other and "parts by mass" and "parts by weight" are synonymous to each other.

In addition, a combination of preferable embodiments in the present invention is a more preferable embodiment.

(Composite Anion Exchange Membrane)

The composite anion exchange membrane of the present invention has a surface layer on a single surface or both surfaces of an anion exchange membrane substrate, in which the above-described surface layer contains a copolymer of a monomer A which is a water-soluble polyfunctional monomer and a monomer B which is a cationic monomer, an anion exchange capacity in the above-described surface layer is 0.05 meq/cm$^3$ to 0.50 meq/cm$^3$, and an anion exchange capacity in the above-described anion exchange membrane substrate is 1.0 meq/cm$^3$ to 5.0 meq/cm$^3$.

The composite anion exchange membrane of the present invention is preferably a composite anion exchange membrane for removing nitrate ions.

In the monovalent ion selective permeable composite anion exchange membrane in the related art, it is difficult to achieve both improvement of selective permeability of monovalent ions and suppression of energy consumption during electrodialysis.

Although the detailed mechanism is unknown, the inventors of the present invention have found that it is possible to obtain a composite anion exchange membrane which has excellent selective permeability of monovalent ions and of which energy consumption is suppressed.

The composite anion exchange membrane of the present invention will be described while referring to drawings. The same reference numeral indicates the same object.

FIG. 1 is a schematic cross-sectional view showing an embodiment of a composite anion exchange membrane of the present invention.

In FIG. 1, an anion exchange membrane substrate 1 has surface layers 2 on both surfaces. The anion exchange membrane substrate 1 preferably has the surface layers 2 on both the surfaces, but may have a surface layer 2 on a single surface.

In a case of using the anion exchange membrane substrate 1 having the surface layer 2 on a single surface for electrodialysis, it is preferable to dispose the surface having the surface layer 2 so as to be on a cathode side.

Hereinafter, each component constituting the composite anion exchange membrane of the present invention will be described.

<Surface Layer>

In the surface layers included in the composite anion exchange membrane of the present invention, the anion exchange capacity is 0.05 meq/cm$^3$ to 0.50 meq/cm$^3$, preferably 0.10 meq/cm$^3$ to 0.40 meq/cm$^3$, and more preferably 0.10 meq/cm$^3$ to 0.30 meq/cm$^3$.

If the anion exchange capacity of a surface layer is within the above-described range, it is possible to obtain a composite anion exchange membrane which has excellent selective permeability of monovalent ions and of which power consumption is suppressed.

It is possible to adjust the anion exchange capacity of a surface layer using the content of a monomer B-derived constitutional repeating unit in a copolymer.

It is possible to measure the anion exchange capacity of an anion exchange membrane substrate to be described below and a surface layer from the distribution of counter anions of the cationic monomers while performing an elementary analysis of a membrane cross section through energy dispersive X-ray spectrometry (SEM-EDX). In the present invention, an average value of three points is used.

The thickness of the surface layer used in the present invention, as the thickness of a single surface, is preferably 1 to 50 μm, more preferably 1.5 to 40 μm, and particularly preferably 2 to 30 μm.

The surface layer included in the composite anion exchange membrane of the present invention contains a copolymer of a monomer A which is a water-soluble polyfunctional monomer and a monomer B which is a cationic monomer (hereinafter, also simply referred to as a "copolymer").

[Monomer A]

A monomer A is a water-soluble polyfunctional monomer.

In the present invention, the monomer being water-soluble means that 5 mass % or more of the monomer is dissolved in distilled water at 25° C.

In addition, the monomer in the present invention means a compound having a molecular weight (weight average molecular weight in a case where the compound has a molecular weight distribution) of less than or equal to 3,000.

From the viewpoint of curability, the molecular weight (weight average molecular weight in a case where the compound has a molecular weight distribution) of the monomer A is preferably less than or equal to 2,000 and more preferably less than or equal to 1,000.

The monomer A preferably has two or more polymerizable groups and more preferably has two polymerizable groups. The monomer A is not particularly limited, but is preferably a radical polymerizable compound, more preferably a monomer having an ethylenically unsaturated group, and still more preferably a (meth)acrylate compound or a (meth)acrylamide compound.

In addition, the monomer A is preferably a monomer having an ethylene glycol chain or a monomer having a polyethylene glycol chain.

—Monomer Having Ethylene Glycol Chain or Monomer Having Polyethylene Glycol Chain—

A monomer having an ethylene glycol chain or a polyethylene glycol chain is not particularly limited as long as the monomer is a polyfunctional polymerizable compound having an ethylene glycol chain, but is preferably a (meth)acrylate compound having a polyethylene glycol chain or a (meth)acrylamide compound having a polyethylene glycol chain and preferably polyethylene glycol di(meth)acrylate, or polyethylene glycol diglycidyl ether.

The repeating number of an ethylene glycol unit in polyethylene glycol di(meth)acrylate is preferably 6 to 30, more preferably 8 to 25, and still more preferably 8 to 10.

According to the above-described embodiment, it is possible to obtain a composite anion exchange membrane which has excellent selective permeability of monovalent ions and of which power consumption is suppressed.

A commercially available product can also be used as the monomer having an ethylene glycol chain or a polyethylene glycol chain, and preferred examples thereof include polyethylene glycol #400 diacrylate, polyethylene glycol #600 diacrylate, polyethylene glycol #1000 diacrylate (all are manufactured by SHIN-NAKAMURA CHEMICAL CO., LTD.).

[Monomer B]

A monomer B is a cationic monomer. The monomer B is preferably a monomer having a cationic group and at least one polymerizable group. The cationic group is not particularly limited, but is preferably a quaternary ammonium salt group.

The monomer corresponding to the monomer B is not regarded to correspond to the monomer A. From the viewpoint of curability, the molecular weight (weight average molecular weight in a case where the compound has a molecular weight distribution) of the monomer B is preferably less than or equal to 2,000 and more preferably less than or equal to 1,000.

The monomer B is not particularly limited, but is preferably a radical polymerizable compound, more preferably a monomer having an ethylenically unsaturated group, still more preferably a styrene compound, a (meth)acrylate compound, or a (meth)acrylamide compound, and particularly preferably a (meth)acrylate compound or a (meth)acrylamide compound.

In addition, the monomer B is preferably a monomer having a quaternary ammonium group.

—Monomer Having Quaternary Ammonium Group—

The monomer having a quaternary ammonium group is not particularly limited as long as the monomer is a polymerizable compound having a quaternary ammonium group, but is preferably a (meth)acrylate compound or a (meth) acrylamide compound.

Preferred examples of the monomer having a quaternary ammonium group include a compound represented by the following Formula MA.

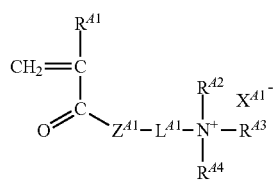

(MA)

In Formula MA, $R^{a1}$ represents a hydrogen atom or an alkyl group and $R^{a2}$ to $R^{a4}$ each independently represent an alkyl group or an aryl group. Here, two or more of $R^{a2}$ to $R^{a4}$ may be bonded to each other to form a ring. $Z^{41}$ represents —O— or —N(Ra)—. Here, Ra represents a hydrogen atom or an alkyl group. $L^{A1}$ represents an alkylene group. $X^{A1}$ represents a halogen ion or an aliphatic or an aromatic carboxylate ion.

The alkyl groups such as $R^{41}$, $R^{42}$ to $R^{44}$, and Ra are linear or branched alkyl groups, and the number of carbon atoms thereof is preferably 1 to 10, more preferably 1 to 6, still more preferably 1 to 4, particularly preferably 1 or 2, and most preferably 1. Examples thereof include a methyl group, an ethyl group, an n-propyl group, an isopropyl group, an n-butyl group, a t-butyl group, an n-hexyl group, an n-octyl group, a 2-ethyl hexyl group, an n-dodecyl group, and an isodecyl group.

The number of carbon atoms of aryl groups in $R^{42}$ to $R^{44}$ is preferably 6 to 16, more preferably 6 to 12, and still more preferably 6 to 10. Examples thereof include a phenyl group and a naphthyl group.

The number of carbon atoms of an alkylene group of $L^{41}$ is preferably 1 to 10, more preferably 2 to 10, still more preferably 2 to 6, still more preferably 2 to 4, particularly preferably 2 or 3, and most preferably 3. Examples thereof include a methylene group, an ethylene group, a propylene group, a hexamethylene group, an octamethylene group, and a decamethylene group.

Examples of halogen ions in $X^{41}$ include fluoride ions, chlorine ions, bromine ions, and iodide ions.

The number of carbon atoms of aliphatic carboxylate ions in $X^{41}$ is preferably 1 to 11, more preferably 2 to 7, still more preferably 2 to 5, particularly preferably 2 or 3, and most preferably 2.

Aliphatic carboxylate ions may be any one of a carboxylic acid of saturated hydrocarbon and a carboxylic acid of unsaturated hydrocarbon, but are preferably a carboxylic acid of saturated hydrocarbon.

Aromatic carboxylate ions in $X^{41}$ are preferably aryl carboxylate ions or heteroaryl carboxylate ions. Here, heteroaryl is preferably a 5- or 6-membered ring, a ring-constituting heteroatom is preferably a nitrogen atom, an oxygen atom, or a sulfur atom, and more preferably a nitrogen atom. The number of carbon atoms in the aromatic carboxylate ions is preferably 1 to 17, more preferably 2 to 13, and still more preferably 3 to 11. Examples thereof include benzoate ions, naphthalene carboxylate ions, nicotinate ions, and isonicotinate ions.

As a ring formed by bonding two or more of $R^{42}$ to $R^{44}$ to each other, a single ring or a cross-linked ring of a 5- or 6-membered ring is preferable, and the number of carbon atoms thereof is preferably 4 to 16 and more preferably 4 to 10. Examples thereof include a pyrrolidine ring, a piperazine ring, a piperidine ring, a morpholine ring, a thiomorpholine ring, an indole ring, and a quinuclidine ring.

$R^{41}$ is preferably a hydrogen atom and a methyl group and more preferably a hydrogen atom. $R^{41}$ to $R^{44}$ are preferably a methyl group and an ethyl group. $Z^{41}$ is preferably —N(Ra)— and Ra is preferably a hydrogen atom. $X^{41}$ is preferably a halogen atom.

Hereinafter, specific examples of the compounds represented by Formula MA will be shown. However, the present invention is not limited thereto.

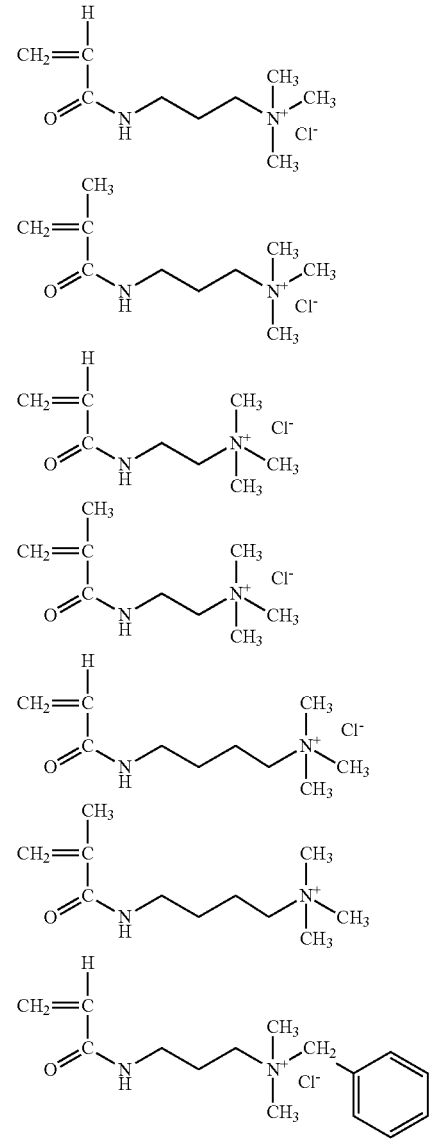

-continued
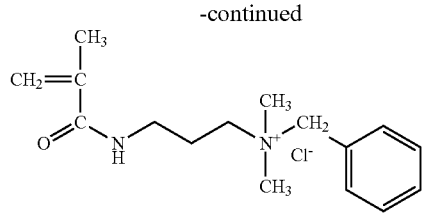
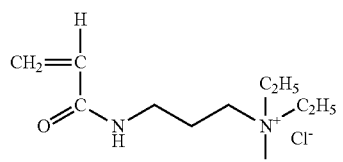
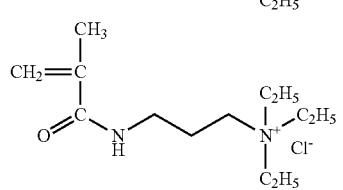
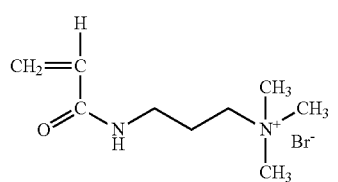
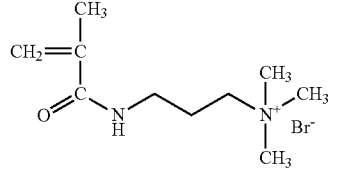
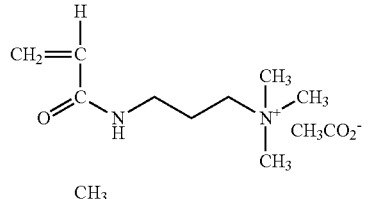
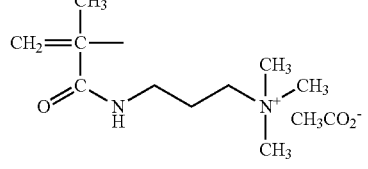
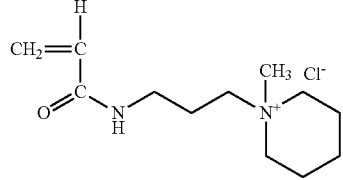
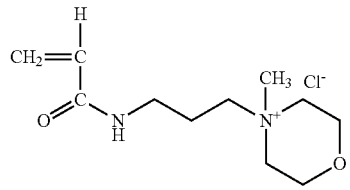
-continued
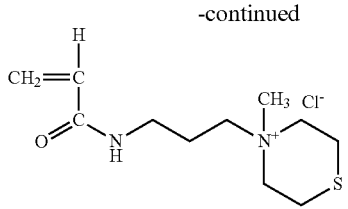
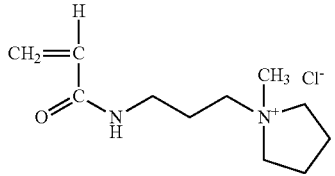
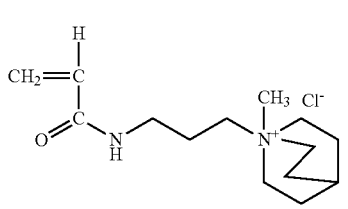
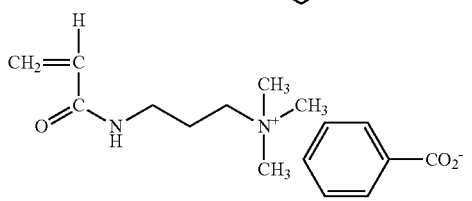
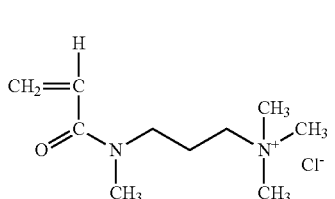
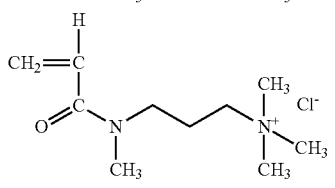
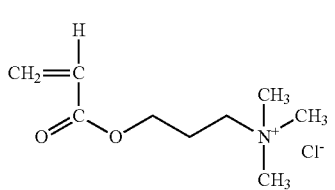
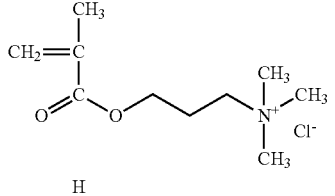
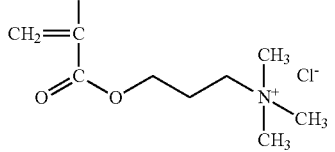

-continued

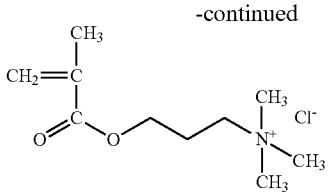

In addition, as the monomer having a quaternary ammonium group, it is possible to use, for example, compounds represented by the following Formula A.

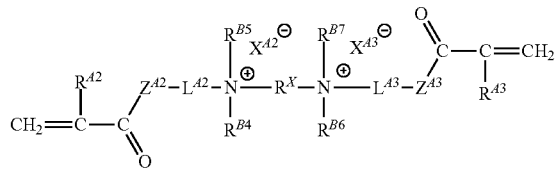

(A)

In Formula A, $R^{A2}$ and $R^{A3}$ each independently represent a hydrogen atom or an alkyl group, $R^{B4}$ to $R^{B7}$ each independently represent an alkyl group or an aryl group. $Z^{A2}$ and $Z^{A3}$ each independently represent —O— or —NRa—. Here, Ra represents a hydrogen atom or an alkyl group. $L^{A2}$ and $L^{A3}$ each independently represent an alkylene group and $R^X$ represents an alkylene group, an alkenylene group, an alkynylene group, an arylene group, —O—, a ketone group, —SO$_2$—, or a divalent linking group in which these are combined. Each divalent linkage may have a substituent. $X^{A2}$ and $X^{A3}$ each independently represent a halogen ion or an aliphatic or aromatic carboxylate ion.

Here, $R^{A2}$ and $R^{A3}$ are synonymous to $R^{A1}$ in Formula MA, and are preferably a hydrogen atom or a methyl group.

$R^{B4}$ to $R^{B7}$ each independently represent an alkyl group or an aryl group, and are preferably an alkyl group having 1 to 8 carbon atoms, an aryl group having 6 to 10 carbon atoms, more preferably an alkyl group having 1 to 4 carbon atoms, and still more preferably a methyl group.

$Z^{A2}$ and $Z^{A3}$ are synonymous to $Z^{A1}$ in Formula MA, and are preferably —NH— or —NCH$_3$—.

$X^{A2}$ and $X^{A3}$ are synonymous to $X^{A1}$ in Formula MA, and are preferably chlorine ions.

$R^X$ represents an alkylene group, an alkenylene group, an alkynylene group, an arylene group, —O—, or a divalent linking group in which these are combined, and preferably represents an alkylene group having 1 to 8 carbon atoms, an alkenylene group having 2 to 8 carbon atoms, an arylene group having 6 to 10 carbon atoms, or a divalent group in which two or more thereof are bonded to each other. In addition, $R^X$ may be substituted. Representative examples of the substituent include a halogen atom.

$L^{A2}$ and $L^{A3}$ each independently represent an alkylene group, and are preferably an alkylene group having 1 to 8 carbon atoms and more preferably an alkylene group having 1 to 4 carbon atoms.

Hereinafter, specific examples of the polymerizable compounds represented by Formula A will be shown. However, the present invention is not limited thereto.

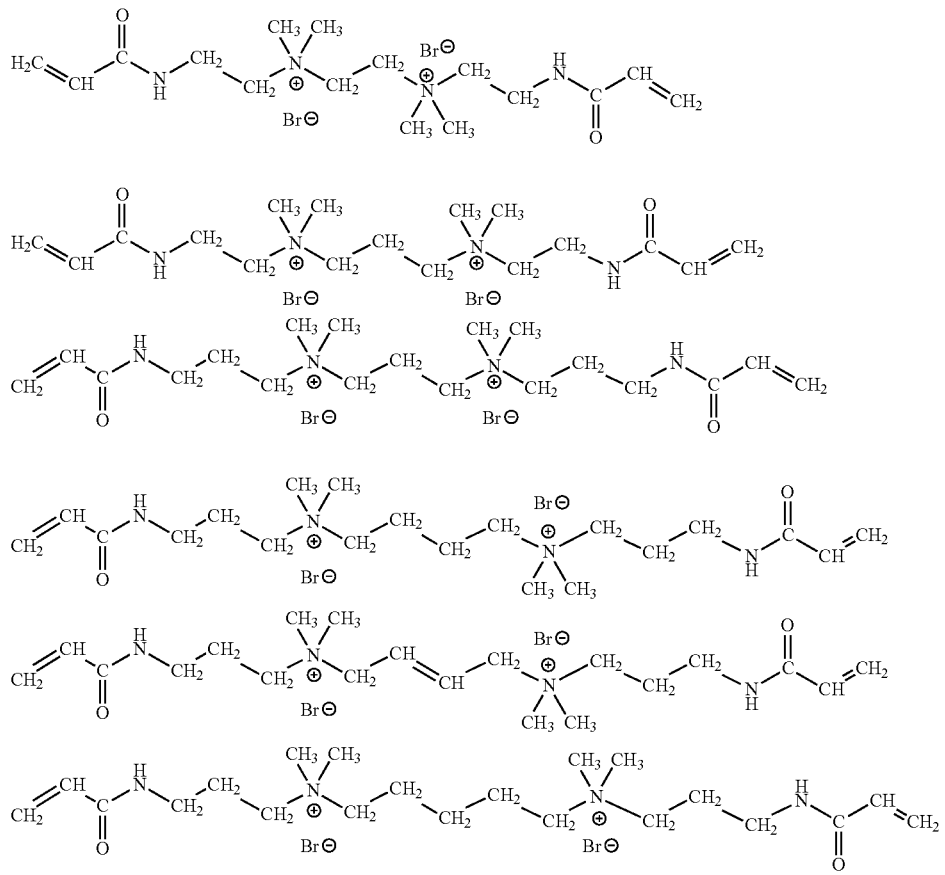

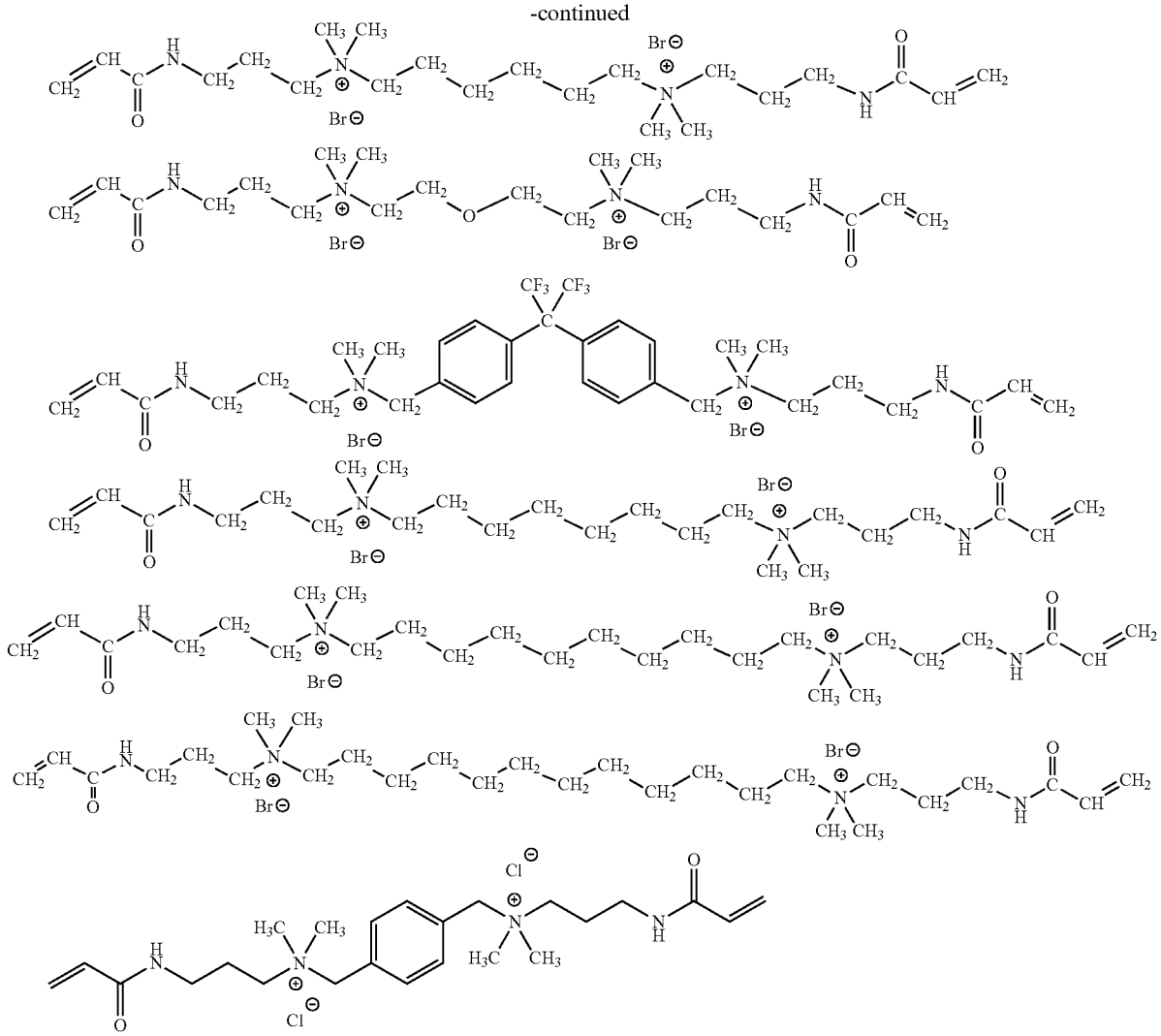

A polymerizable compound represented by Formula A can be obtained by allowing a compound represented by the following Formula A-1 and a compound represented by the following Formula A-2 to react with each other.

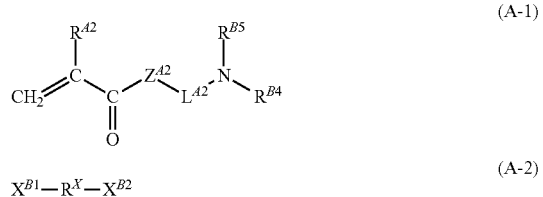

In Formula A-1, $R^{A2}$, $R^{B4}$, $R^{b5}$, $Z^{A2}$, and $L^{A2}$ are synonymous to corresponding $R^{A2}$, $R^{B4}$, $R^{b5}$, $Z^{A2}$, and $L^{A2}$ in Formula A, and preferred ranges are also the same as each other.

In Formula A-2, $R^X$ is synonymous to $R^X$ in Formula A and preferred ranges are also the same as each other. $X^{B1}$ and $X^{B2}$ each independently represent a halogen atom or an aliphatic or aromatic acyloxy group.

Here, $X^{B1}$ and $X^{B2}$ represent $X^{A2}$ and $X^{A3}$ in Formula A by being released as anions through reaction with a polymerizable compound represented by Formula A-1.

—Method for Producing Copolymer—

The method for producing a copolymer is not particularly limited, and any well-known method can be used. However, it is preferable to produce a surface layer forming composition containing a monomer A, a monomer B, and a polymerization initiator using heat and/or ultraviolet rays.

From the viewpoint of membrane uniformity, a photopolymerization initiator is preferable as the above-described polymerization initiator, and the above-described polymerization is preferably performed through photopolymerization.

[Surface Layer Forming Composition]

The surface layer used in the present invention is preferably a polymer of a surface layer forming composition containing a monomer A, a monomer B, and a polymerization initiator.

Hereinafter, the monomer A is called a component A, the monomer B is called a component B, and the polymerization initiator is called a component C.

The molar ratio containing the monomer A and the monomer B in the surface layer forming composition is preferably monomer A:monomer B=98:2 to 85:15.

In addition, the content of the monomer A in the surface layer forming composition with respect to the total solid content of the surface layer forming composition is preferably 60 to 95 mass %, more preferably 70 to 95 mass %, and still more preferably 75 to 95 mass %.

The solid content of a composition represents an amount obtained by removing volatile components such as a solvent.

The content of the monomer B in the surface layer forming composition with respect to the total solid content of the surface layer forming composition is preferably 1 to 15 mass % and more preferably 3 to 10 mass %.

In addition, from the viewpoints of productivity and membrane uniformity, a photopolymerization initiator is preferable as the above-described polymerization initiator and a photopolymerization initiator represented by the following Formula PI-1 is preferable.

That is, the surface layer used in the present invention is preferably a polymer of a surface layer forming composition containing the monomer A, the monomer B, and the photopolymerization initiator represented by the following Formula PI-1.

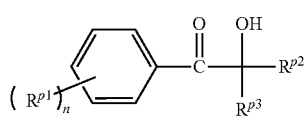

(PI-1)

In Formula PI-1, $R^{p1}$ represents an alkyl group, an alkenyl group, an alkoxy group, or an aryloxy group, $R^{p2}$ and $R^{p3}$ each independently represent a hydrogen atom, an alkyl group, an alkenyl group, an alkoxy group, or an aryloxy group, $R^{p2}$ and $R^{p3}$ may be bonded to each other to form a ring, and n represents an integer of 0 to 5.

$R^{p1}$ is preferably an alkyl group having 1 to 18 carbon atoms, an alkenyl group having 2 to 10 carbon atoms, an alkoxy group having 1 to 10 carbon atoms, and an aryloxy group having 6 to 12 carbon atoms. The alkyl group, the alkenyl group, the alkoxy group, and the aryloxy group may have a substituent, and examples of the substituent include an arbitrary substituent selected from the following substituent a.

An aryl group of the aryloxy group is preferably a phenyl group.

$R^{p1}$ is more preferably an alkyl group having 1 to 4 carbon atoms and an alkoxy group having 1 to 4 carbon atoms. In a case where $R^{p1}$ is an alkoxy group, a methoxy group and 2-hydroxyethoxy group are preferable. In a case where $R^{p1}$ is an alkyl group, a methyl group substituted with a phenyl group is preferable. It is preferable that —C(=O)—C($R^{p2}$)($R^{p3}$)(OH) is substituted with a phenyl group and forms a methylenebis body as a whole molecule.

It is preferable that $R^{p2}$ and $R^{p3}$ each independently represent an alkyl group, an alkenyl group, an alkoxy group, or an aryloxy group, more preferably an alkyl group having 1 to 8 carbon atoms, an alkenyl group having 2 to 8 carbon atoms, an alkoxy group having 1 to 8 carbon atoms, an aryloxy group having 6 to 10 carbon atoms, still more preferably an alkyl group, and particularly preferably a methyl group. The alkyl group, the alkenyl group, the alkoxy group, and the aryloxy group may have a substituent. The above-described substituent is not particularly limited, and examples thereof include an alkyl group, an aryl group, an alkoxy group, an aryloxy group, an acyl group, an acyloxy group, and a hydroxy group.

A ring which is formed through the bonding of $R^{p2}$ and $R^{p3}$ to each other is preferably a 5- or 6-membered ring and more preferably a cyclopentene ring or a cyclohexane ring.

Hereinafter, specific examples of polymerization initiators represented by Formula PI-1 will be shown. However, the present invention is not limited thereto.

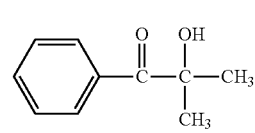

(PI-1-1)

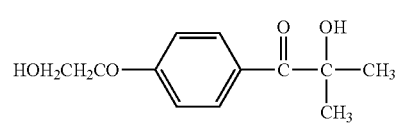

(PI-1-2)

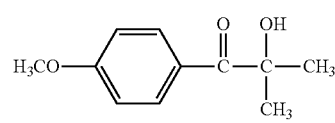

(PI-1-3)

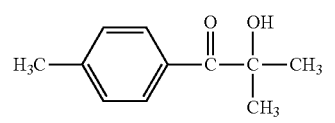

(PI-1-4)

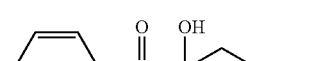

(PI-1-5)

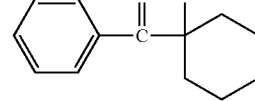

(PI-1-6)

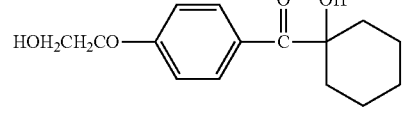

(PI-1-7)

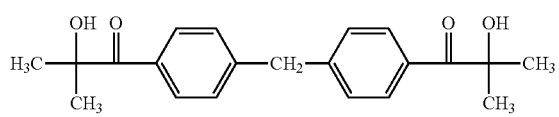

Photopolymerization initiators represented by Formula PI-1 can be obtained from BASF Japan Ltd or the like.

In the present invention, the content of a polymerization initiator with respect to the total solid content of the surface layer forming composition is preferably 0.1 to 10 parts by mass, more preferably 0.1 to 5 parts by mass, and particularly preferably 0.5 to 3 parts by mass. If the content of a polymerization initiator is within the above-described range, the polymerization initiator has excellent curability.

—Other Components—

The surface layer forming composition used in the present invention may contain other components in addition to the above-described components A to C. Examples of other components include a component D: a polymerizable compound other than the component A and the component B, a component E: a polymerization inhibitor, and a component F: a solvent. Each will be described below.

Component D: Polymerizable Compound Other than Component A and Component B

The surface layer forming composition of the present invention may contain a polymerizable compound other than the component A and the component B as a component D. Here, it is preferable that the component D plays a role of adjusting the hydrophilicity or hydrophobicity of a membrane and cross-linking density in order to adjust the water permeability of a composite anion exchange membrane of the present invention or electric resistance of a membrane.

The component D may be any one of a monomer, an oligomer, and a polymer, but is preferably a monomer. In the present invention, the oligomer means a compound having a weight average molecular weight exceeding 3,000 and being less than or equal to 10,000, and the polymer means a compound having a weight average molecular weight exceeding 10,000.

The component D may be other monofunctional polymerizable compounds. The "other monofunctional polymerizable compounds" are monofunctional polymerizable compounds which do not correspond to the above-described components A and B. Examples of such other monofunctional polymerizable compounds include well-known monomers such as acrylic acid esters, methacrylic acid esters, acrylamides, methacrylamides, vinyl esters, styrenes, acrylonitrile, and maleic acid imide. With the use of such monomers, it is possible to improve various physical properties such as membrane-forming properties, membrane strength, hydrophilicity, hydrophobicity, solubility, reactivity, and stability. As a method of synthesizing monomers, it is possible to refer to, for example, an item of ester synthesis in "The Fifth Series Of Experimental Chemistry, Vol. 16, Synthesis of Organic Compounds (II-1)" of The Chemical Society of Japan, Maruzen Inc., or an item of handling and purification of monomers in "The Fifth Series Of Experimental Chemistry, Vol. 26, Polymer Chemistry" of The Chemical Society of Japan, Maruzen Inc.

Among them, a compound having no ester bond, a (meth)acrylamide compound, a vinyl ether compound, an aromatic vinyl compound, an N-vinyl compound (a polymerizable monomer having an amide bond), and an allyl compound are preferable and a (meth)acrylamide compound is particularly preferable, from the viewpoints of stability and pH resistance of an obtained composite anion exchange membrane.

Examples of the "other monofunctional polymerizable compounds" include compounds disclosed in JP2008-208190A or JP2008-266561A.

Specific examples of the "other monofunctional polymerizable compounds" will be shown below, but the present invention is not limited to these specific examples.

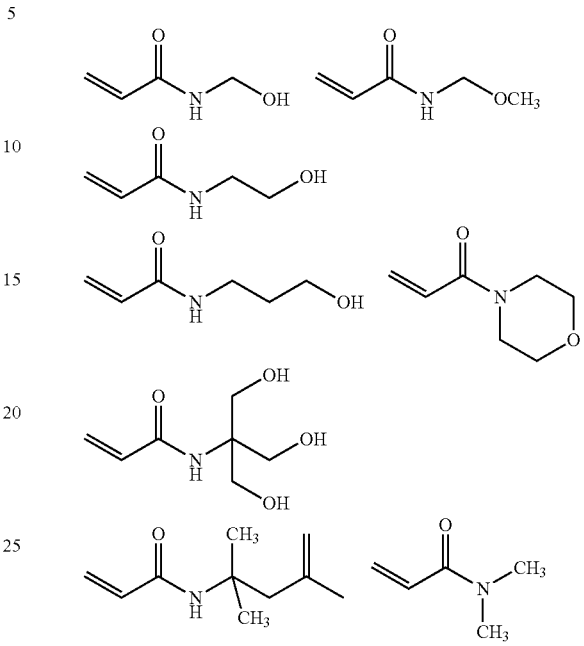

These compounds are commercially available from KOHJIN Film & Chemicals Co., Ltd., KYOWA HAKKO CHEMICAL CO., LTD., Fluka, Aldrich, and TOAGOSEI CO., LTD., and can be easily synthesized through a well-known method.

The surface layer forming composition of the present invention may contain a bifunctional or higher polyfunctional polymerizable compound as the component D. The component D is preferably a polyfunctional (meth)acrylamide compound.

Preferred polyfunctional polymerizable compounds as the component D will be exemplified below, but the present invention is not limited thereto.

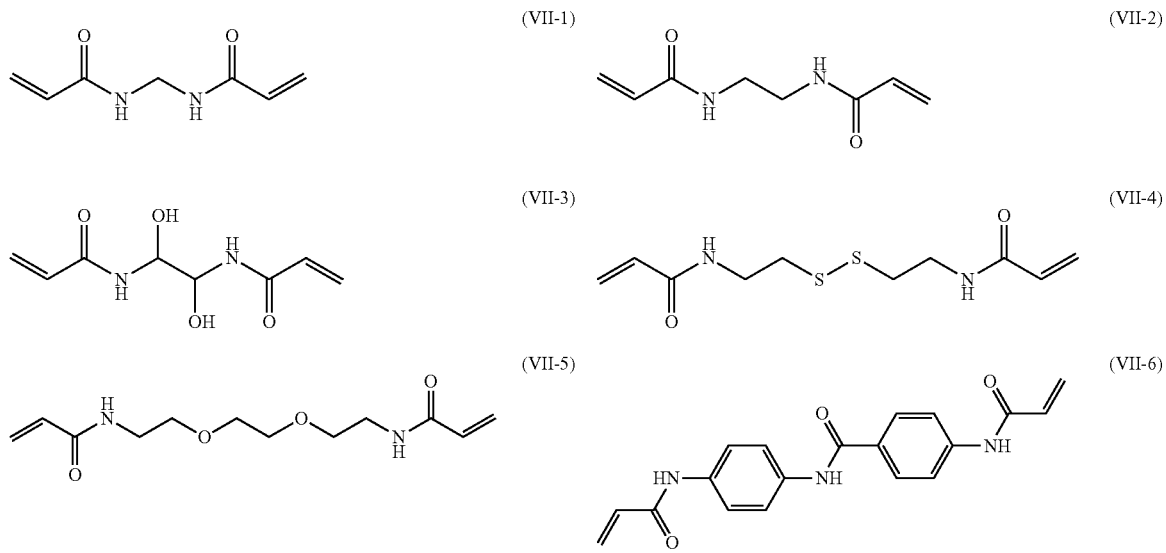

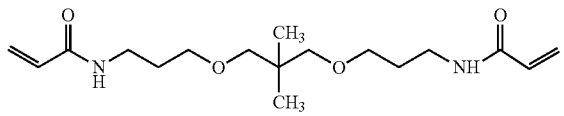
(VII-7)

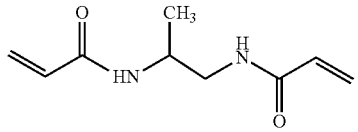
(VII-8)

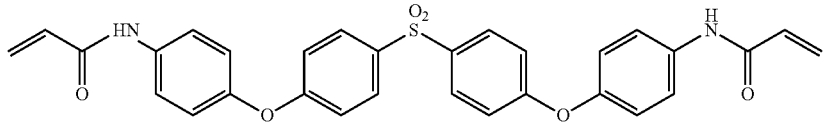
(VII-9)

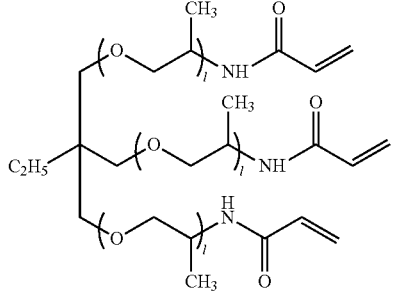
(VII-10)

Here, 1 of the compound (VII-10) represents an integer of 1 or more.

The content of the component D is preferably smaller than the total content of a monomer A and monomer B (less than the content of the monomer A and the monomer B), more preferably less than or equal to 20% of the total content of the monomer A and the monomer B, and still more preferably less than or equal to 10% of the total content of the monomer A and the monomer B.

Component E: Polymerization Inhibitor

In the present invention, the surface layer forming composition preferably contains a polymerization inhibitor in order to impart stability of the composition.

A well-known polymerization inhibitor can be used as the polymerization inhibitor and examples thereof include a phenol compound, a hydroquinone compound, an amine compound, and a mercapto compound.

Specific examples of the phenol compound include hindered phenol (phenol having a t-butyl group at an ortho position, and typical examples thereof include 2,6-di-t-butyl-4-methylphenol) and bisphenol. Specific examples of the hydroquinone include monomethyl ether hydroquinone. These polymerization inhibitors may be used singly or two or more thereof may be used in combination.

The content of a polymerization inhibitor with respect to the total solid content in the surface layer forming composition is preferably 0.01 to 5 parts by mass, more preferably 0.01 to 1 parts by mass, and still more preferably 0.01 to 0.5 parts by mass.

Component F: Solvent

The surface layer forming composition in the present invention may contain a solvent as a component F. The content of the solvent in the surface layer forming composition with respect to the total surface layer forming composition is preferably 1 to 30 mass %, more preferably 1 to 20 mass %, and still more preferably 1 to 15 mass %.

Due to the solvent contained in the composition, a polymerization curing reaction proceeds uniformly and smoothly. In addition, in a case where a porous support is impregnated with the surface layer forming composition, the impregnation proceeds smoothly.

As the solvent, water and/or a "solvent of which the solubility in water is greater than or equal to 5 mass %" are preferably used and water and/or a "solvent which is freely mixed with water" are more preferably used. For this reason, a solvent selected from water and a water-soluble solvent is preferable, and water alone, a water-soluble solvent alone, or a mixture thereof is preferable.

An alcohol solvent, an ether solvent which is an aprotic polar solvent, an amide solvent, a ketone solvent, a sulfoxide solvent, a sulfone solvent, a nitrile solvent, and an organophosphorus solvent are particularly preferable as the water-soluble solvent.

Examples of the alcohol solvent include methanol, ethanol, isopropanol, n-butanol, ethylene glycol, propylene glycol, diethylene glycol, and dipropylene glycol. These can be used singly or two or more thereof can be used in combination.

In addition, examples of the preferred aprotic polar solvent include dimethyl sulfoxide, dimethyl imidazolidinone, sulfolane, N-methylpyrrolidone, dimethylformamide, acetonitrile, acetone, dioxane, tetramethylurea, hexamethylphosphoramide, hexamethylphosphorotriamide, pyridine, propionitrile, butanone, cyclohexanone, tetrahydrofuran, tetrahydropyran, ethylene glycol diacetate, and γ-butyrolactone. Among them, dimethyl sulfoxide, N-methylpyrrolidone, dimethylformamide, dimethyl imidazolidinone, sulfolane, acetonitrile, or tetrahydrofuran is preferable. These can be used singly or two or more thereof can be used in combination.

The surface layer forming composition used in the present invention may contain, for example, a surfactant, a viscosity improver, a surface tension adjusting agent, and a preservative as necessary.

<Anion Exchange Membrane Substrate>

In the anion exchange membrane substrate used in the composite anion exchange membrane of the present invention, the anion exchange capacity is 1 meq/cm$^3$ to 5.0 meq/cm$^3$, preferably 1.2 meq/cm$^3$ to 4.5 meq/cm$^3$, and more preferably 1.5 meq/cm$^3$ to 4.0 meq/cm$^3$.

The anion exchange capacity of the anion exchange membrane substrate can be adjusted in accordance with the content of an anion exchange polymer or the content of an anion exchange group in the anion exchange polymer.

The anion exchange membrane substrate used in the present invention is not particularly limited and a well-known anion exchange membrane can be used. For example, it is possible to use a hydrocarbon-based or fluorine-based anion exchange membrane. A hydrocarbon-based anion exchange membrane is preferable, an acrylic or styrene-based anion exchange membrane is more preferable, and an acrylic anion exchange membrane is still more preferable.

The hydrocarbon-based anion exchange membrane in the present invention represents an anion exchange membrane containing a hydrocarbon-containing resin.

The fluorine-based anion exchange membrane in the present invention represents an anion exchange membrane containing a perfluoroalkylene group-containing resin. Examples of the above-described resin include a tetrafluoroethylene/perfluoroalkyl vinyl ether copolymer.

The styrene-based anion exchange membrane in the present invention represents an anion exchange membrane containing a resin derived from a styrene compound. Examples of the suitable styrene compound include styrene and divinylbenzene which may have a substituent.

The acrylic anion exchange membrane in the present invention represents an anion exchange membrane containing a resin derived from a compound having a (meth)acryloyl group. Examples of the suitable compound having a (meth)acryloyl group include a (meth)acrylic acid ester compound and a (meth)acrylamide compound.

Hereinafter, the acrylic anion exchange membrane will be described as an example of the anion exchange membrane substrate, but the present invention is not limited thereto.

[Acrylic Anion Exchange Membrane]

The acrylic anion exchange membrane used in the present invention preferably has a resin layer carried on a porous support.

The thickness of the above-described acrylic anion exchange membrane as a composite containing a porous support and a resin layer is preferably 10 to 250 μm, more preferably 30 to 200 μm, and particularly preferably 40 to 200 μm.

By setting the membrane thickness to be within this range, it is possible to suppress electric resistance of the membrane to stay low.

—Porous Support—

The acrylic anion exchange membrane used in the present invention preferably has a porous support. By allowing a resin layer forming composition to be described below to be present in a hole of this porous support, the porous support can be constituted as a part of the membrane. Examples of the porous support as a reinforcing material include synthetic woven fabrics, nonwoven fabrics such as synthetic nonwoven fabrics, sponge-like films, and films having fine through holes.

Examples of the material forming the porous support in the present invention include a porous membrane based on polyethylene, polypropylene, polyacrylonitrile, polyvinyl chloride, polyester, polyamide, and copolymers thereof, or polysulfone, polyether sulfone, polyphenylene sulfone, polyphenylene sulfide, polyimide, polyethermide, polyamide, polyamideimide, polyacrylonitrile, polycarbonate, polyacrylate, cellulose acetate, polypropylene, poly(4-methyl-1-pentene), polyvinylidene fluoride, polytetrafluoroethylene, polyhexafluoropropylene, polychlorotrifluoroethylene, and copolymers thereof. A commercially available porous support is commercially available from, for example, MITSUBISHI PAPER MILLS LIMITED, NIPPON KODOSHI CORPORATION, Asahi Kasei Corporation, Japan Vilene Company, Ltd., TAPYRUS CO., LTD., and Freudenberg Filtration Technologies.

In a case of performing a polymerization curing reaction through energy ray irradiation, it is necessary not to block a wavelength region of an energy ray and to allow a porous support and the material for reinforcing the porous support (porous reinforcing material) to transmit the irradiation at a wavelength used for polymerization curing.

Here, it is preferable that a resin layer forming composition can permeate the porous reinforcing material.

In addition, the porous support preferably has hydrophilicity. It is possible to use a usual method such as a corona treatment, a plasma treatment, a fluorine gas treatment, an ozone treatment, a sulfuric acid treatment, and a silane coupling agent treatment in order to impart hydrophilicity to a support.

The porous support in the present invention is preferably a nonwoven fabric. Among nonwoven fabrics, a nonwoven fabric formed of composite fibers of polyethylene and polypropylene is preferable. In addition, the diameter of this composite fiber is preferably 0.5 to 30 μm, more preferably 1 to 25 μm, and particularly preferably 2 to 20 μm.

The thickness of the porous support in the present invention is preferably 20 to 250 μm, more preferably 30 to 230 μm, and particularly preferably 40 to 200 μm.

—Resin Layer—

The resin layer of the acrylic anion exchange membrane used in the present invention contains anion exchange polymers.

The above-described anion exchange polymers are all polymers containing a unit obtained from an acryloyl group which may have an alkyl group at the α-position.

Here, the acryloyl group which may have an alkyl group at the α-position is preferably an acryloylamino group or an acryloyloxy group which may have an alkyl group at the α-position and more preferably an acryloylamino group which may have an alkyl group at the α-position.

In the present invention, any anion exchange group may be used as long as the anion exchange polymer having an anion exchange group is a polymer containing a unit obtained from the acryloyl group which may have an alkyl group at the α-position, but may be an anion exchange group of which a nitrogen atom in a nitrogen-containing hetero ring is a cation such as pyridinium, an anion exchange group having a quaternized nitrogen atom, an anion exchange group of which a nitrogen atom of an aromatic hetero ring is substituted with a substituent like in a case of alkylation or arylation, or an anion exchange group having a quaternized amino group, that is, an onio group.

Among them, an anion exchange polymer having a unit represented by Formula IA is preferable.

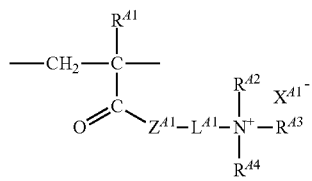

In Formula IA, $R^{41}$ represents a hydrogen atom or an alkyl group, and $R^{42}$ to $R^{44}$ each independently represent an alkyl group or an aryl group. Here, two or more of $R^{42}$ to $R^{44}$ may be bonded to each other to form a ring. $Z^{41}$ represents —O— or —N(Ra)—. Here, Ra represents a hydrogen atom or an alkyl group. $L^{41}$ represents an alkylene group. $X^{41}$ represents a halogen ion or an aliphatic or aromatic carboxylate ion.

The alkyl groups such as $R^{41}$, $R^{42}$ to $R^{44}$, and Ra are linear or branched alkyl groups, and the number of carbon atoms thereof is preferably 1 to 10, more preferably 1 to 6, more preferably 1 to 4, particularly preferably 1 or 2, and most preferably 1. Examples thereof include a methyl group, an ethyl group, an n-propyl group, an isopropyl group, an n-butyl group, a t-butyl group, an n-hexyl group, an n-octyl group, a 2-ethyl hexyl group, an n-dodecyl group, and an isodecyl group.

The number of carbon atoms of aryl groups of $R^{42}$ to $R^{44}$ is preferably 6 to 16, more preferably 6 to 12, and still more preferably 6 to 10. Examples thereof include a phenyl group and a naphthyl group.

The number of carbon atoms of an alkylene group of $L^{41}$ is preferably 1 to 10, more preferably 2 to 10, still more preferably 2 to 6, still more preferably 2 to 4, particularly preferably 2 or 3, and most preferably 3. Examples thereof include a methylene group, an ethylene group, a propylene group, a hexamethylene group, an octamethylene group, and a decamethylene group.

Examples of halogen ions in $X^{41}$ include fluoride ions, chlorine ions, bromine ions, and iodide ions.

The number of carbon atoms of aliphatic carboxylate ions in $X^{41}$ is preferably 1 to 11, more preferably 2 to 7, still more preferably 2 to 5, particularly preferably 2 or 3, and most preferably 2.

Aliphatic carboxylate ions may be any one of carboxylic acid of saturated hydrocarbon and carboxylic acid of unsaturated hydrocarbon, but are preferably carboxylic acid of saturated hydrocarbon.

Aromatic carboxylate ions in $X^{41}$ are preferably aryl carboxylate ions or heteroaryl carboxylate ions. Here, heteroaryl is preferably a 5- or 6-membered ring, a ring-constituting heteroatom is preferably a nitrogen atom, an oxygen atom, or a sulfur atom, and more preferably a nitrogen atom. The number of carbon atoms of the aromatic carboxylate ions is preferably 1 to 17, more preferably 2 to 13, and still more preferably 3 to 11. Examples thereof include benzoate ions, naphthalene carboxylate ions, nicotinate ions, and isonicotinate ions.

As a ring formed by bonding two or more of R to $R^{44}$ to each other, a single ring or a cross-linked ring of a 5- or 6-membered ring is preferable, and the number of carbon atoms thereof is preferably 4 to 16 and more preferably 4 to 10. Examples thereof include a pyrrolidine ring, a piperazine ring, a piperidine ring, a morpholine ring, a thiomorpholine ring, an indole ring, and a quinuclidine ring.

$R^{41}$ is preferably a hydrogen atom and a methyl group and more preferably a hydrogen atom. $R^{41}$ to $R^{44}$ are preferably a methyl group and an ethyl group. $Z^{41}$ is preferably —N(Ra)— and Ra is preferably a hydrogen atom. $X^{41}$ is preferably a halogen atom.

Hereinafter, specific examples of units represented by Formula IA will be shown. However, the present invention is not limited thereto.

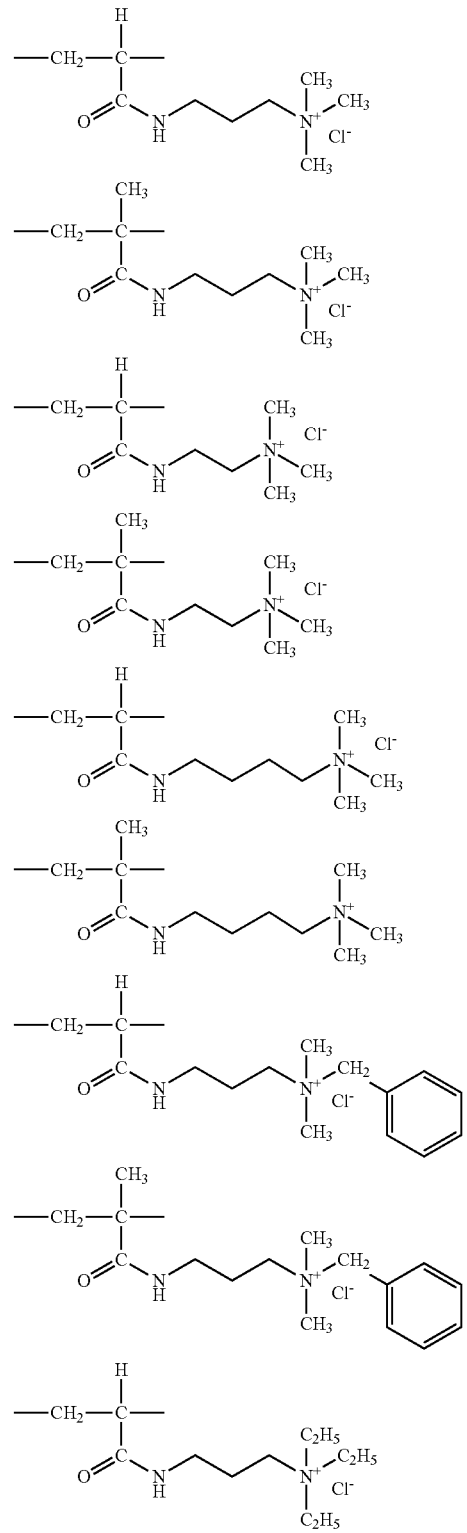

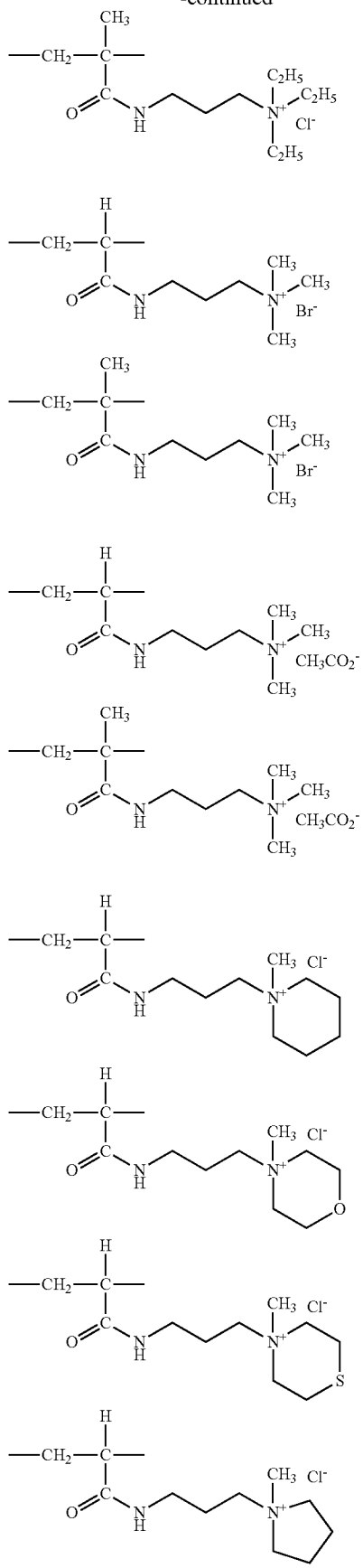
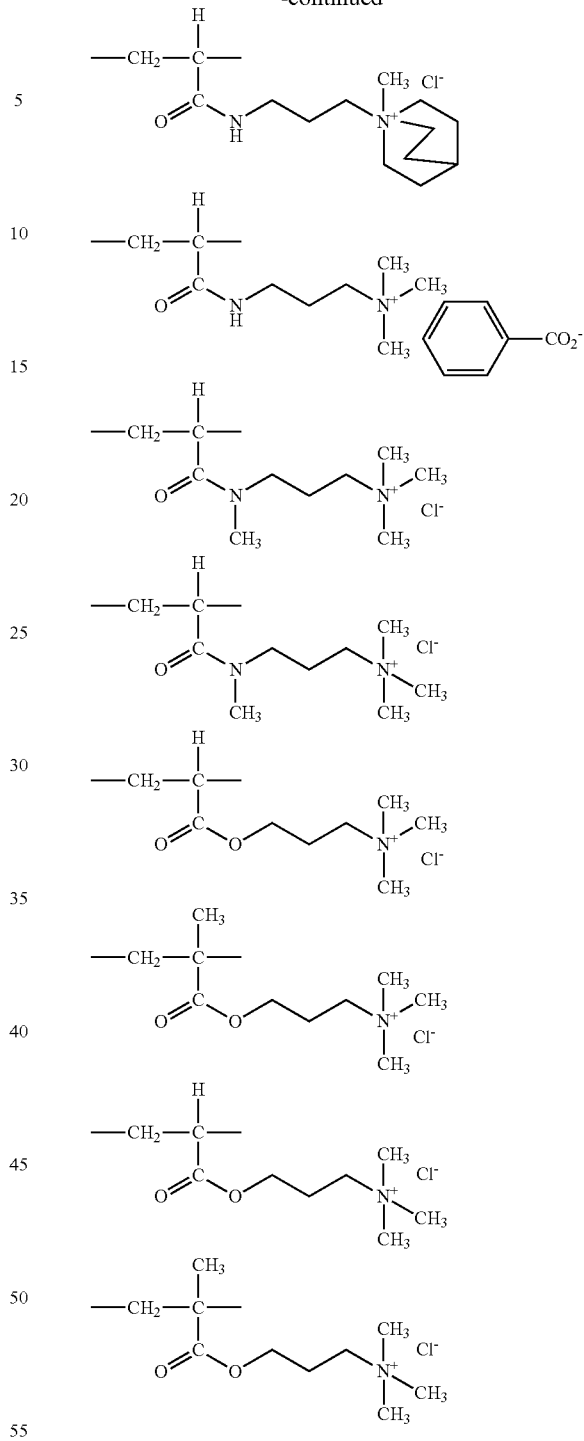

Units represented by Formula IA are preferably constitutional repeating units derived from compounds (cationic monomers) which are represented by the above-described Formula MA and have been described as the monomers B.

The anion exchange polymer used in the present invention preferably has a unit obtained from a cross-linking agent in addition to units represented by the above-described Formula IA.

Any polyfunctional ethylenically unsaturated compound can be used as the cross-linking agent without particular limitation.

A bifunctional ethylenically unsaturated compound having two terminal ethylenically unsaturated groups is preferable as the polyfunctional ethylenically unsaturated compound.

The terminal ethylenically unsaturated groups are preferably (meth)acryloyl groups, and preferably (meth)acryloyloxy groups or (meth)acrylamide groups. In addition, it is preferable that a plurality of terminal ethylenically unsaturated groups are all the same as each other from the viewpoint of synthesis suitability.

The molecular weight of the polyfunctional ethylenically unsaturated compound is preferably 100 to 2,000 and more preferably 100 to 1,000.

Examples of a preferred polyfunctional ethylenically unsaturated compound include N,N'-alkylene bis(meth) acrylamide, alkylene di(meth) acrylate, and poly(oxyalkylene) di(meth)acrylate.

In addition, the compounds which are represented by the above-described Formula A and have been described as the monomers B are also suitably used as the cross-linking agents.

—Method for Producing Anion Exchange Membrane Substrate—

The anion exchange membrane substrate used in the present invention can be produced by, for example, subjecting a porous support to coating and/or impregnation with a resin layer forming composition containing at least compounds represented by Formula MA and a polymerization initiator, and subjecting the porous support to polymerization curing through light irradiation and/or heating.

The component C in the above-described surface layer forming composition can be preferably used as the polymerization initiator.

In addition, the above-described resin layer forming composition may further contain the above-described cross-linking agent, the components D to F in the above-described surface layer forming composition, an alkali metal compound, a surfactant, a viscosity improver, a surface tension regulator, and a preservative.

The anion exchange membrane substrate can be produced in a batch manner using a fixed support, but may be continuously produced (continuous manner) using a moving support. The support may have a roll shape which is continuously rewound. In the case of a continuous manner, a support is placed on a continuously moving belt and it is possible to continuously perform coating using a coating liquid which is a resin layer forming composition and forming a membrane by performing polymerization curing. However, only one of the coating and the membrane forming may be continuously performed.

A temporary support (peeling off a membrane from the temporary support after completion of a polymerization curing reaction) may be used separately from the support until the polymerization curing reaction is completed after immersing the resin layer forming composition in the support.

In such a temporary support, it is unnecessary to consider material permeation, and any temporary support may be used as long as, for example, the temporary support includes a metal plate such as an aluminum plate and can be fixed for forming a membrane.

—Coating Method—

A porous support can be coated with or impregnated in the resin layer forming composition through various methods, for example, curtain coating, extrusion coating, air knife coating, slide coating, nip roll coating, forward roll coating, reverse roll coating, immersion coating, kiss coating, rod bar coating, or spray coating. Coating of a plurality of layers can be simultaneously or continuously performed. Curtain coating, slide coating, slot die coating, and extrusion coating are preferable for simultaneous multilayer coating.

In the production of an anion exchange membrane substrate in a continuous manner, the anion exchange membrane substrate is more preferably produced using a production unit including: a coating portion of a resin layer forming composition which continuously coats a moving support with a resin layer forming composition; an irradiation source for performing polymerization curing of the resin layer forming composition; a membrane winding portion; and means for moving the support from the coating portion of a resin layer forming composition to the irradiation source and the membrane winding portion.

—Irradiation Method—

In the above-described production unit, the coating portion of a resin layer forming composition is provided at an upstream position of the irradiation source which is placed at an upstream position of the membrane winding portion.

In order to have sufficient fluidity while performing coating using a high speed coater, the viscosity of the resin layer forming composition in the present invention at 35° C. is preferably less than 4,000 mPa·s, more preferably 1 to 1,000 mPa·s, and most preferably 1 to 500 mPa·s. The viscosity thereof in a case of slide bead coating is preferably 1 to 100 mPa·s.

It is possible to coat a moving support with a coating liquid which is a resin layer forming composition in the present invention using a high speed coater at a speed exceeding 15 m/min and even at a speed exceeding 20 m/min.

In a case of using a support in order to particularly increase the mechanical strength, the support may be subjected to a corona discharge treatment, a glow discharge treatment, a flame treatment, an ultraviolet irradiation treatment, and the like in order to, for example, improve the wettability and adhesion of the support before coating the support with the resin layer forming composition in the present invention.

Polymerization curing of the resin layer forming composition in the present invention preferably starts within 60 seconds, more preferably starts within 15 seconds, particularly preferably starts within 5 seconds, and most preferably starts within 3 seconds after coating or impregnating of the support with the resin layer forming composition.

Light irradiation of the polymerization curing is preferably performed for shorter than 10 seconds, more preferably performed for shorter than 5 seconds, particularly preferably performed for shorter than 3 seconds, and most preferably performed for shorter than 2 seconds. In the continuous method, the irradiation is continuously performed, and the duration for the polymerization curing reaction is determined in consideration of the speed at which the resin layer forming composition moves through an irradiation beam.

In a case of using a high intensity ultraviolet ray (UV light) for the polymerization curing reaction, a considerable amount of heat is generated. Therefore, it is preferable to cool down a lamp of a light source and/or the support or a membrane using cooling air in order to prevent overheating. In a case where a significant amount of infrared light (IR light) is emitted together with an UV beam, the UV light is emitted using an IR-reflective quartz plate as a filter.

An ultraviolet ray is preferable as an energy ray. An irradiation wavelength is preferably matched with an absorption wavelength of an arbitrary photopolymerization initiator contained in the resin layer forming composition, and examples thereof include UV-A (400 to 320 nm), UV-B (320 to 280 nm), and UV-C (280 to 200 nm).

An ultraviolet ray source is a mercury arc lamp, a carbon arc lamp, a low pressure mercury lamp, a medium pressure mercury lamp, a high pressure mercury lamp, a swirl flow plasma arc lamp, a metal halide lamp, a xenon lamp, a tungsten lamp, a halogen lamp, a laser, and an ultraviolet ray emitting diode. A medium pressure or high pressure mercury vapor type ultraviolet ray emitting lamp is preferable. In addition to this, additives such as metal halides may be present in order to modify an emission spectrum of a lamp. A lamp having a light emission maximum of 200 to 450 nm is particularly suitable.

An energy output of the irradiation source is preferably 20 to 1,000 W/cm and preferably 40 to 500 W/cm. However, the energy output thereof may be higher than or lower than the range as long as it is possible to achieve a desired exposure amount. The polymerization curing of a membrane is adjusted using the intensity of the exposure. The exposure amount is measured using High Energy UV Radiometer (UV Power Puck™ manufactured by BIT-Instrument Markets) within a UV-A range indicated in the device, and is preferably at least greater than or equal to 40 mJ/cm$^2$, more preferably 100 to 2,000 mJ/cm$^2$, and most preferably 150 to 1,500 mJ/cm$^2$. The duration for the exposure can be freely selected, but is preferably short and most preferably less than 2 seconds.

In a case where the coating speed is high, a plurality of light sources may be used in order to obtain the necessary exposure amount. In this case, the exposure intensities of the plurality of light sources may be the same as or different from each other.

(Method for Producing Composite Anion Exchange Membrane)

The method for producing a composite anion exchange membrane of the present invention includes: coating a single surface or both surfaces of an anion exchange membrane substrate with a surface layer forming composition; and forming a surface layer by polymerizing the above-described coated surface layer forming composition, in which an anion exchange capacity of the above-described surface layer is 0.05 meq/cm$^3$ to 0.50 meq/cm$^3$, and an anion exchange capacity of the above-described anion exchange membrane substrate is 1.0 meq/cm$^3$ to 5.0 meq/cm$^3$.

The method for producing a composite anion exchange membrane of the present invention is preferably a method for producing a composite anion exchange membrane that is used for removing nitrate ions.

Hereinafter, each producing method will be described.

<Coating>

The method for producing a composite anion exchange membrane of the present invention includes coating a single surface or both surfaces of an anion exchange membrane substrate with a surface layer forming composition.

The surface layer forming composition and the anion exchange membrane substrate are the same as those described above and preferred ranges are also the same as those described above.

[Coating Method]

The method for coating a surface layer forming composition is not particularly limited, and any well-known method can be used.

The surface layer forming composition can be used for coating the top of an anion exchange membrane substrate through various methods, for example, curtain coating, extrusion coating, air knife coating, slide coating, nip roll coating, forward roll coating, reverse roll coating, immersion coating, kiss coating, rod bar coating, or spray coating.

The surface of an anion exchange membrane substrate may be roughened using sand paper or the like or may be subjected to a corona treatment, a plasma treatment, or the like as a pretreatment for performing coating using a surface layer forming composition, in order to improve adhesion between the anion exchange membrane substrate and the surface layer.

<Drying>

The method for producing a composite anion exchange membrane of the present invention may include drying the surface layer forming composition after the coating.

The drying method is not particularly limited, and it is preferable to perform drying by adding heat.

Heating means is not limited as long as it is possible to dry a solvent contained in a dispersion liquid, and it is possible to perform heating using a heat drum, warm air, an infrared lamp, a thermal oven, a heat plate, and the like.

The heating temperature is preferably about 40° C. to 100° C., more preferably about 40 to 90° C., and still more preferably about 40 to 80° C.

The duration for the drying may be appropriately set in consideration of the thickness of a layer or the like, but is preferably about 1 to 30 minutes.

In a case of coating both surfaces of an anion exchange membrane substrate with a surface layer forming composition in the coating, the coating and the drying may be alternately performed to form a surface layer on each single surface.

<Forming a Surface Layer>

The method for producing a composite anion exchange membrane of the present invention includes forming a surface layer by polymerizing a surface layer forming composition, after the coating.

The above-described polymerization is preferably performed using an active ray and/or heat and more preferably performed through photopolymerization by emitting an active ray.

For forming a surface layer, it is preferable to use an ultraviolet ray from the viewpoint of simplicity of facilities or production speed. Heating may be further performed after performing a crosslinking reaction using the above-described ultraviolet ray.

An irradiation wavelength is preferably matched with an absorption wavelength of an arbitrary photopolymerization initiator contained in a dispersion liquid, and examples thereof include UV-A (400 to 320 nm), UV-B (320 to 280 nm), and UV-C (280 to 200 nm).

For forming a surface layer, gas such as air or oxygen may coexist during the polymerization reaction, but it is preferable that the atmosphere is in an inert gas atmosphere.

Examples of the ultraviolet ray source include a mercury arc lamp, a carbon arc lamp, a low pressure mercury lamp, a medium pressure mercury lamp, a high pressure mercury lamp, a swirl flow plasma arc lamp, a metal halide lamp, a xenon lamp, a tungsten lamp, a halogen lamp, a laser, and an ultraviolet ray emitting diode. A medium pressure or high pressure mercury vapor type ultraviolet ray emitting lamp is preferable. In addition to this, additives such as metal halides may be present in order to modify an emission spectrum of a lamp. A lamp having a light emission maximum of 200 to 450 nm is particularly suitable.

An energy output of the irradiation source is preferably 20 to 1,000 W/cm and preferably 40 to 500 W/cm. However, the energy output thereof may be higher than or lower than the range as long as it is possible to achieve a desired exposure amount. The polymerization curing of a membrane is adjusted using the intensity of the exposure. The exposure amount is measured using High Energy UV Radiometer (UV Power Puck™ manufactured by EIT-Instrument Markets) within a UV-A range indicated in the device, and is preferably at least greater than or equal to 40 mJ/cm$^2$, more preferably 100 to 2,000 mJ/cm$^2$, and most preferably 150 to 1,500 mJ/cm$^2$. The duration for the exposure can be freely selected, but is preferably short and most preferably less than 2 seconds.

Heating means is not limited as long as it is possible to dry a solvent contained in the surface layer forming composition, and it is possible to perform heating using a heat drum, warm air, an infrared lamp, a thermal oven, a heat plate, and the like.

The heating temperature is more preferably about 100° C. to 200° C. and still more preferably about 120 to 180° C.

The duration for the heating may be appropriately set in consideration of the thickness of a layer or the like, but is preferably short being shorter than 10 seconds.

In the method for producing a composite anion exchange membrane of the present invention, the composite anion exchange membrane of the present invention can be produced in a batch manner using a fixed anion exchange membrane substrate, but may be produced in a continuous manner. The anion exchange membrane substrate may have a roll shape which is continuously rewound.

In the case of the continuous manner, it is possible to first form an anion exchange membrane substrate and to produce a composite anion exchange membrane of the present invention by further performing the above-described coating and the above-described drying continuously, that is, it is possible to perform the formation of an anion exchange membrane substrate and the formation of a surface layer in a continuous manner. The formation of the above-described anion exchange membrane substrate is performed through, for example, coating using a resin layer forming composition and emitting of an active radiation.

(Ion Exchange Membrane Module •Ion Exchange Device)

The composite anion exchange membrane of the present invention can be suitably used by being modularized. Examples of modules include a spiral type module, a hollow fiber type module, a pleated type module, a tubular type module, plate and frame type modules, and a stack type module.

In addition, it is possible to set an ion exchange device having means for ion exchange, desalting, or purifying, using an ion exchange membrane module of the present invention. The ion exchange membrane module can also be suitably used as a fuel cell.

Figure 2:
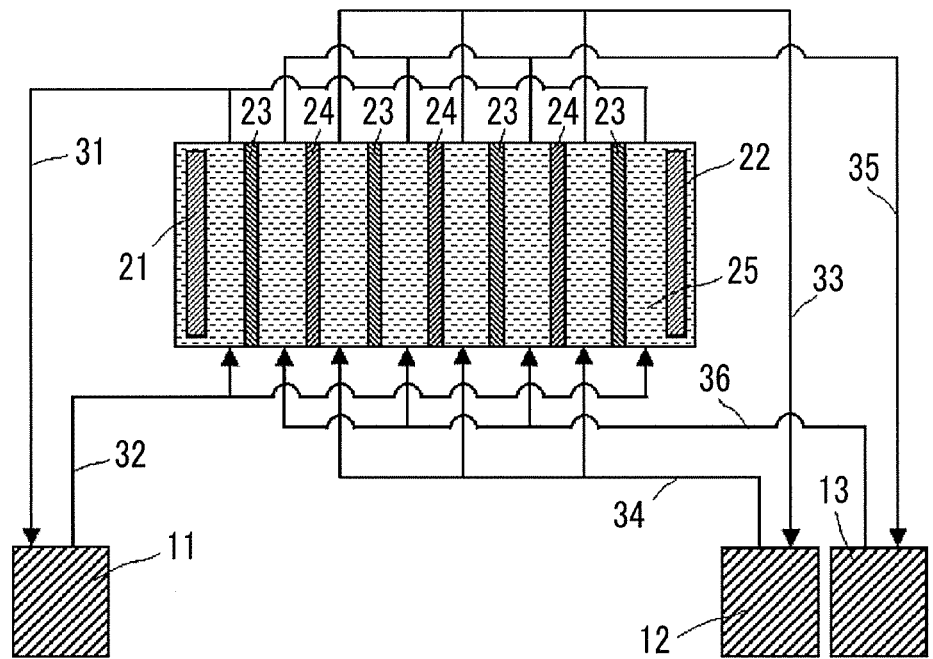
FIG. 2 is a schematic view showing an example of an ion exchange device in which the composite anion exchange membrane of the present invention is used.

An example of the ion exchange device of the present invention is shown in FIG. 2. The ion exchange device has an electrodialysis layer 25 alternately having a cation exchange membrane 23 and a composite anion exchange membrane 24 between an anode electrode 21 and a cathode electrode 22. An electrode liquid from an electrode liquid tank 11 is shared between the anode electrode 21 and the cathode electrode 22 as shown in arrows 31 and 32. A desalted liquid and a concentrated liquid respectively circulate from a desalted liquid tank 12 as shown in arrows 33 and 34 and from a concentrated liquid tank 13 as shown in arrows 35 and 36.

EXAMPLES

Hereinafter, the present invention will be further specifically described using Examples. The material, the usage, the proportion, treatment contents, a treatment procedure, and the like shown in Examples below can be appropriately modified without departing from the gist of the present invention. Accordingly, the scope of the present invention is not limited to specific examples shown below. Unless otherwise specified, "parts" and "%" are on a mass basis.

(Anion Exchange Capacity)

The anion exchange capacity of a surface layer and an anion exchange membrane substrate were measured from the distribution of Cl$^-$ while performing an elementary analysis of a membrane cross section through energy dispersive X-ray spectrometry (SEM-EDX). In both of the surface layer and the anion exchange membrane substrate, measurement was performed at three points and an average value thereof was set to a measurement value of the anion exchange capacity.

(Production of Anion Exchange Membrane Substrates 1 to 4)

Aluminum plates were respectively coated manually with coating liquids of resin layer forming compositions having compositions shown in Table 1 described below at a speed of about 5 m/min using a 150 μm wire-wound rod. Subsequently, the coating liquids which had been used for coating the aluminum plates were brought into contact with non-woven fabrics (FO-2223-10 with a thickness of 100 μm manufactured by Freudenberg) which had been used as supports for subjecting these supports to impregnation with the coating liquids. Next, excess coating liquids were removed using rods which were not wound with wires. The temperatures of the coating liquids during the coating were about 25° C. (room temperature). Thereafter, anion exchange membranes were produced by subjecting the above-described coating liquid-impregnated supports to a curing reaction using a UV exposure machine (model: Light Hammer 10 manufactured by Fusion UV Systems, D-bulb, conveyor speed of 1.0 to 9.5 m/min, strength of 100%). The exposure amount in a UV-A region was 1,000 mJ/cm$^2$. In addition, the exposure was appropriately repeated in order to obtain a desired exposure amount.

The obtained membranes were removed from the aluminum plates and were stored in a dry box at a temperature of 25° C. and a humidity of 50% as anion exchange membrane substrates 1 to 4.

The thickness and the anion exchange capacity of each of the anion exchange membrane substrates 1 to 4 are described in Table 1.

TABLE 1

| Component | Name of compound | Anion exchange membrane substrate 1 | Anion exchange membrane substrate 2 | Anion exchange membrane substrate 3 | Anion exchange membrane substrate 4 |
|---|---|---|---|---|---|
| Cationic monomer | DMAPAA-Q 75% aqueous solution | 54.48 | 59.48 | 9.48 | 54.48 |

TABLE 1-continued

| Component | Name of compound | Anion exchange membrane substrate 1 | Anion exchange membrane substrate 2 | Anion exchange membrane substrate 3 | Anion exchange membrane substrate 4 |
|---|---|---|---|---|---|
| Cross-linking agent | MBA | 15.00 | 5.00 | — | 15.00 |
|  | CL-1 | — | 15.00 | 60.00 | — |
| Solvent | Pure water | 10.00 | 10.00 | 20.00 | 10.00 |
|  | IPA | 10.00 | 10.00 | 10.00 | 10.00 |
| Alkali metal compound | LiNO$_3$ | 10.00 | 0.00 | 0.00 | 10.00 |
| Polymerization initiator | Darocur 1173 | 0.50 | 0.50 | 0.50 | 0.50 |
| Polymerization inhibitor | MEHQ | 0.02 | 0.02 | 0.02 | 0.02 |
| Total |  | 100 | 100 | 100 | 100 |
| Exposure amount (mJ/cm$^2$) |  | 1000 | 1000 | 1000 | 1000 |
| Thickness (μm) of PP/PE support 2223-10 |  | 100 | 100 | 100 | 100 |
| Thickness (μm) of anion exchange membrane substrate |  | 110 | 110 | 110 | 110 |
| Anion exchange capacity (meq/cm$^3$) of anion exchange membrane substrate |  | 2.0 | 2.4 | 2.8 | 2.0 |

The details of the compounds described in Table 1 are shown below. The units of the numerical values in the column of components of the compositions in Table 1 are parts by mass of active components and "-" represents that the compositions do not contain the component.

DMAPAA-Q: dimethylaminopropylacrylamide methyl chloride quaternary salt (manufactured by KOHJIN Film & Chemicals Co., Ltd.)

MBA: methylene bisacrylamide (manufactured by Wako Pure Chemical Industries, Ltd.)

CL-1: compound having the following structure, synthetic product

Pure water: pure water (manufactured by Wako Pure Chemical Industries, Ltd.)

IPA: isopropyl alcohol (manufactured by Wako Pure Chemical Industries, Ltd.)

LiNO$_3$: lithium nitrate (manufactured by Wako Pure Chemical Industries, Ltd.)

Darocur 1173: 2-hydroxy-2-methyl-1-phenyl-propane-1-one (manufactured by BASF)

MEHQ: monomethyl ether hydroquinone (manufactured by Sigma-Aldrich Co., LLC)

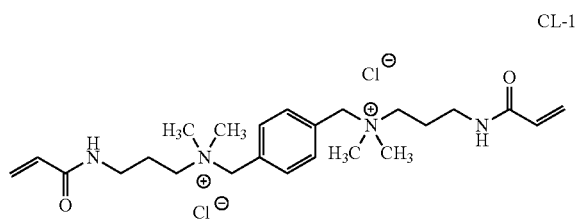 [SMILES: [Cl-] ; C=CC(=O)NCCC[N+](C)(C)Cc1ccc(C[N+](C)(C)CCCNC(=O)C=C)cc1 ; [Cl-]]

CL-1

<Synthesis of CL-1>

31.3 g of N-[3-(dimethylaminopropyl)acrylamide] (200 mmol, Tokyo Chemical Industry Co., Ltd.) was added to a mixed solution of 17.5 g of 1,4-bis (chloromethyl) benzene (100 mmol, Wako Pure Chemical Industries, Ltd.), 156 mL of acetonitrile, 310 mL of methanol, and 24.4 mg of 4-methoxyphenol (Tokyo Chemical Industry Co., Ltd.), and the mixture was stirred for 2 hours at 50° C. After the reaction, filtration was performed, 1.54 L of acetone was added thereto, and the mixture was stirred for 1 hour at room temperature. Next, produced crystals were filtered to obtain 48.3 g of white crystals (moisture content of 7.0%, yield of 92%) of a compound (CL-1).

Examples 1 to 10 and Comparative Examples 1 to 5

<Formation of Surface Layer>

First, anion exchange membrane substrates were fixed on aluminum plates. Next, surface layer coating liquids were prepared for Examples and Comparative Examples in accordance with compositions shown in the following Table 2 or 3 and were used to coat the top of the anion exchange membrane substrates. The above-described anion exchange membrane substrate 1 was used as an anion exchange membrane substrate in Examples 1 to 7 and Comparative Examples 1 to 5, the above-described anion exchange membrane substrate 2 was used as an anion exchange membrane substrate in Example 8, the above-described anion exchange membrane substrate 3 was used as an anion exchange membrane substrate in Example 9, and the above-described anion exchange membrane substrate 4 was used as an anion exchange membrane substrate in Example 10. The coating was performed by manually spreading a surface layer coating liquid using a wire-wound rod at a speed of about 5 m/min. After the coating, a surface layer was formed on an anion exchange membrane by subjecting the surface layer to a curing reaction using a UV exposure machine (model: Light Hammer 10 manufactured by Fusion UV Systems, D-bulb, conveyor speed of 10 m/min, strength of 100%). The exposure amount was 500 mJ/cm$^2$ in a UV-A region.

In each of Examples and Comparative Examples, a surface layer was formed on both surfaces or on a single surface of a membrane. In a case of forming surface layers on both surfaces, a single surface was first subjected to coating, and coating and UV exposure were performed on the other surface again under the same conditions after the completion of the coating and UV exposure on the single surface.

In Comparative Example 1, no surface layer was formed. In Comparative Example 2, surface layers were immersed in 1,000 ppm aqueous solution of polystyrenesulfonic acid having a weight average molecular weight of about 10,000 for 17 hours at 25° C., and then, were washed with water to prepare a composite anion exchange membrane having thin layers of polystyrenesulfonic acid on both surfaces of the membrane.

The anion exchange capacity of each surface layer is shown in Tables 2 and 3. Examples in which there was no surface layer or it was impossible to measure the anion exchange capacity since the surface layers contained no cationic group are described as "-".

TABLE 2

| Component | Name of compound | Example 1 | Example 2 | Example 3 | Example 4 | Example 5 | Example 6 | Example 7 | Example 8 |
|---|---|---|---|---|---|---|---|---|---|
| Monomer A | PEG200DA | — | — | — | — | — | — | — | — |
| | PEG400DA | 84.5 | 79.5 | 87.0 | 84.5 | 84.5 | — | — | 84.5 |
| | PEG600DA | — | — | — | — | — | 84.5 | — | — |
| | PEG1000DA | — | — | — | — | — | — | 84.5 | — |
| Monomer B | DMAPAA-Q 75% aqueous solution | 5.0 | 10.0 | 2.5 | — | — | 5.0 | 5.0 | 5.0 |
| | TMAEMAC 80% aqueous solution | — | — | — | 5.0 | — | — | — | — |
| | VBTMAC | — | — | — | — | 5.0 | — | — | — |
| Solvent | Pure water | 10 | 10 | 10 | 10 | 10 | 10 | 10 | 10 |
| Polymerization initiator | Darocur 1173 | 0.5 | 0.5 | 0.5 | 0.5 | 0.5 | 0.5 | 0.5 | 0.5 |
| Total | | 100 | 100 | 100 | 100 | 100 | 100 | 100 | 100 |
| Surface on which surface layer is formed | | Both surfaces | Both surfaces | Both surfaces | Both surfaces | Both surfaces | Both surfaces | Both surfaces | Both surfaces |
| Exposure amount (mJ/cm$^2$) | | 500 | 500 | 500 | 500 | 500 | 500 | 500 | 500 |
| Membrane thickness (μm) of surface layer | | 10 | 10 | 10 | 10 | 10 | 10 | 10 | 10 |
| Anion exchange capacity (meq/cm$^3$) of surface layer | | 0.2 | 0.4 | 0.1 | 0.2 | 0.3 | 0.2 | 0.2 | 2.0 |

TABLE 3

| Component | Name of compound | Example 9 | Example 10 | Comparative Example 1 | Comparative Example 2 | Comparative Example 3 | Comparative Example 4 | Comparative Example 5 |
|---|---|---|---|---|---|---|---|---|
| Monomer A | PEG200DA | — | — | No surface layer formed | Formation method is described in specification | — | — | 84.5 |
| | PEG400DA | 84.5 | 84.5 | | | 59.5 | 88.5 | — |
| | PEG600DA | — | — | | | — | — | — |
| | PEG1000DA | — | — | | | — | — | — |
| Monomer B | DMAPAA-Q 75% aqueous solution | 5.0 | 5.0 | | | 30.0 | 1.0 | 5.0 |
| | TMAEMAC 80% aqueous solution | — | — | | | — | — | — |
| | VBTMAC | — | — | | | — | — | — |
| Solvent | Pure water | 10 | 10 | | | 10 | 10 | 10 |
| Polymerization initiator | Darocur 1173 | 0.5 | 0.5 | | | 0.5 | 0.5 | 0.5 |
| Total | | 100 | 100 | | | 100 | 100 | 100 |
| Surface on which surface layer is formed | | Both surfaces | Single surface | | | Both surfaces | Both surfaces | Both surfaces |
| Exposure amount (mJ/cm$^2$) | | 500 | 500 | | | 500 | 500 | 500 |
| Membrane thickness (μm) of surface layer | | 10 | 10 | | | 10 | 10 | 10 |
| Anion exchange capacity (meq/cm$^3$) of surface layer | | 2.8 | 2.0 | — | — | 1.3 | 0.0 | 0.2 |

The details of the compounds described in Table 2 or 3 are shown below. The units of the numerical values in the column of components of the compositions in Table 2 are parts by mass of active components and "-" represents that the compositions do not contain the component.

PEG200DA: polyethylene glycol #200 diacrylate (manufactured by SHIN-NAKAMURA CHEMICAL CO., LTD.)

PEG400DA: polyethylene glycol #400 diacrylate (manufactured by SHIN-NAKAMURA CHEMICAL CO., LTD.)

PEG600DA: polyethylene glycol #600 diacrylate (manufactured by SHIN-NAKAMURA CHEMICAL CO., LTD.)

PEG1000DA: polyethylene glycol #1000 diacrylate (manufactured by SHIN-NAKAMURA CHEMICAL CO., LTD.)

DMAPAA-Q: dimethylaminopropylacrylamide methyl chloride quaternary salt (manufactured by KOHJIN Film & Chemicals Co., Ltd.)

TMAEMAC: methacryloyl choline chloride (manufactured by Sigma-Aldrich Co., LLC)

VBTMAC: vinylbenzyltrimethylammonium chloride (manufactured by AGC SEIMI CHEMICAL CO., LTD.)

Pure water: pure water (manufactured by Wako Pure Chemical Industries, Ltd.)

Darocur 1173: 2-hydroxy-2-methyl-1-phenyl-propane-1-one (manufactured by BASF)

<Evaluation of Composite Anion Exchange Membrane>

[Electrodialysis Test]

A stack was produced by combining a commercially available cation exchange membrane (CMX, manufactured by ASTOM Corporation) and a composite anion exchange membrane, and a desalting test was performed using an electrodialysis device (ACILAZER ED, manufactured by ASTOM Corporation). Specifically, 3 sheets of cation exchange membranes and 2 sheets of composite anion exchange membranes were alternately stacked after placing spacers, in which a flow path was provided, therebetween to produce a stack (stacked body). The effective area of the membranes was 18 cm$^2$.

In a case of using a composite anion exchange membrane having a surface layer on a single surface, the surface having the surface layer was disposed so as to be on a cathode side.

An aqueous solution was prepared such that the concentrations of NaNO$_3$ and NaSO$_4$ became 0.5 N or 0.05 N. A 0.5 N NaNO$_3$ aqueous solution and a 0.5 N NaSO$_4$ aqueous solution were mixed with each other at a volume ratio of 1:1 to produce a 0.5 N mixed liquid. In addition, a 0.05 N NaNO$_3$ aqueous solution and a 0.05 N NaSO$_4$ aqueous solution were mixed with each other at a volume ratio of 1:1 to produce a 0.05 N mixed liquid.

Electrodialysis was performed by allowing a constant current of 30 mA to flow while allowing each mixed liquid to flow into a gap of a stacked body at a flow rate of 10 mL/minute. An aqueous solution on a dilution side was sampled every 5 minutes and the concentration of NO$^{3-}$ and SO$_4^{2-}$ ions was quantitatively determined through ion chromatography. The voltage during electrodialysis was further monitored every 10 seconds.

[Evaluation of Selective Permeability of Monovalent Ions]

In the above-described electrodialysis test, cases where a SO$_4^{2-}$ ion removal rate (([concentration of SO$_4^{2-}$ ions before start of electrodialysis test]−[concentration of SO$_4^{2-}$ ions after 30 minutes])/[concentration of SO$_4^{2-}$ ions before start of electrodialysis test]) with respect to a NO$^{3-}$ ion removal rate (([concentration of NO$^{3-}$ ions before start of electrodialysis test]−[concentration of NO$^{3-}$ ions after 30 minutes])/[concentration of NO$^{3-}$ ions before start of electrodialysis test]) was less than 50%, greater than or equal to 50% and less than 70%, and greater than or equal to 70%, were respectively set as A, B, and C.

Results are described in Table 4. "Selective permeability of monovalent ions in case of 0.5 N" in Table 4 shows a result of a case where a 0.5 N mixed liquid was used as a mixed liquid in the above-described electrodialysis test. In addition, "selective permeability of monovalent ions in case of 0.05 N" shows a result of a case where a 0.05 N mixed liquid was used as a mixed liquid.

[Evaluation of Energy Consumption]

In the above-described electrodialysis test, the energy consumption was calculated in accordance with the following Formula.

(Energy consumption ($J$))=(time integration value of voltage ($V \cdot s$))×(current value 30 (mA)=0.03 A)

The energy consumption was evaluated by comparing with the energy consumption when AMX (manufactured by ASTOM Corporation) was used as an anion exchange membrane. Specifically, the proportion of the energy consumption was calculated in accordance with the following Formula, and then, a case where this value was less than 1.5 was set to A, a case where this value was greater than or equal to 1.5 and less than 2.5 was set to B, and a case where this value was greater than or equal to 2.5 was set to C.

Proportion of energy consumption=(energy consumption in electrodialysis test in which anion exchange membrane of Examples or Comparative Examples is used)÷(energy consumption in electrodialysis test in which AMX is used)

"Evaluation of energy consumption in case of 0.5 N" in Table 4 shows a result of a case where a 0.5 N mixed liquid was used as a mixed liquid in the above-described electrodialysis test. "Evaluation of energy consumption in case of 0.05 N" shows a result of a case where a 0.05 N mixed liquid was used as a mixed liquid in the above-described electrodialysis test.

TABLE 4

|  | Examples | | | | | | | | | | Comparative Examples | | | | |
| --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 | 4 | 5 |
| Anion exchange capacity (meq/cm$^3$) of surface layer | 0.20 | 0.41 | 0.10 | 0.21 | 0.26 | 0.20 | 0.20 | 0.20 | 0.20 | 0.20 | — | — | 1.32 | 0.04 | 0.20 |
| Anion exchange capacity (meq/cm$^3$) of anion exchange membrane substrate | 2.0 | 2.0 | 2.0 | 2.0 | 2.0 | 2.0 | 2.0 | 2.4 | 2.8 | 2.0 | 2.0 | 2.0 | 2.0 | 2.0 | 2.0 |

TABLE 4-continued

| | Examples | | | | | | | | | | Comparative Examples | | | | |
|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 |
| Selective permeability of monovalent ions in case of 0.5 N | A | A | A | A | A | A | A | A | A | A | C | B | C | B | B |
| Energy consumption in case of 0.5 N | A | A | A | A | A | A | A | A | A | A | A | C | A | C | B |
| Selective permeability of monovalent ions in case of 0.05 N | A | B | A | A | A | A | B | A | A | A | C | C | C | C | C |
| Energy consumption in case of 0.05 N | A | A | B | A | A | A | A | A | A | A | A | C | A | C | C |

EXPLANATION OF REFERENCES 1 anion exchange membrane substrate, 2 surface layer, 11 electrode liquid tank, 12 desalted liquid tank, 13 concentrated liquid tank, 21 anode electrode, 22 cathode electrode, 23 cation exchange membrane, 24 composite anion exchange membrane, 25 electrodialysis layer, 31, 32 movement of electrode liquid, 33, 34 movement of desalted liquid, 35, 36 movement of concentrated liquid

What is claimed is:

1. A composite anion exchange membrane comprising:
an anion exchange membrane substrate; and
a surface layer which is provided on a single surface or both surfaces of the anion exchange membrane substrate,
wherein the surface layer contains a copolymer of a monomer A which is a water-soluble polyfunctional monomer and a monomer B which is a cationic monomer,
wherein an anion exchange capacity of the surface layer is 0.05 meq/cm$^3$ to 0.50 meq/cm$^3$, and
wherein an anion exchange capacity of the anion exchange membrane substrate is 1.0 meq/cm$^3$ to 5.0 meq/cm$^3$,
wherein the monomer A is a monomer having an ethylene glycol chain or a monomer having a polyethylene glycol chain, and
wherein the monomer B is a monomer having a quaternary ammonium group includes a compound represented by the following Formula MA or Formula A:

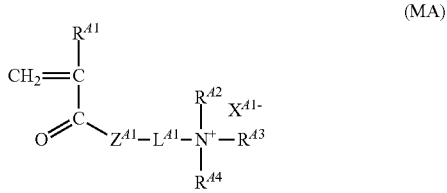

(MA)

in Formula MA, $R^{A1}$ represents a hydrogen atom or an alkyl group; $R^{A2}$ to $R^{A4}$ each independently represent an alkyl group or an aryl group; $Z^{A1}$ represents —O— or —N(Ra)—, wherein Ra represents a hydrogen atom or an alkyl group; $L^{A1}$ represents an alkylene group; $X^{A1}$ represents a halogen ion or an aliphatic or an aromatic carboxylate ion, wherein the number of carbon atoms of the alkylene group of $L^{A1}$ is 2 to 10;

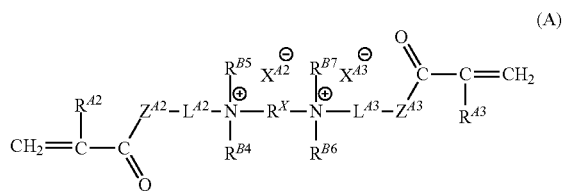

(A)

in Formula A, $R^{A2}$ and $R^{A3}$ each independently represent a hydrogen atom or an alkyl group; $R^{B4}$ to $R^{B7}$ each independently represent an alkyl group or an aryl group; $Z^{A2}$ and $Z^{A3}$ each independently represent —O— or —NRa—, wherein Ra represents a hydrogen atom or an alkyl group; $L^{A2}$ and $L^{A3}$ each independently represent an alkylene group; $R^X$ represents an alkylene group, an alkenylene group, an alkynylene group, an arylene group, —O—, a ketone group, —SO$_2$—, or a divalent linking group in which these are combined; and $X^{A2}$ and $X^{A3}$ each independently represent a halogen ion or an aliphatic or aromatic carboxylate ion.

2. The composite anion exchange membrane according to claim 1,
wherein the monomer having a quaternary ammonium group is a (meth)acrylate compound or a (meth)acrylamide compound.

3. The composite anion exchange membrane according to claim 1,
wherein the monomer having an ethylene glycol chain or the monomer having a polyethylene glycol chain is a (meth)acrylate compound or a (meth)acrylamide compound.

4. The composite anion exchange membrane according to claim 2,
wherein the monomer having an ethylene glycol chain or the monomer having a polyethylene glycol chain is a (meth)acrylate compound or a (meth)acrylamide compound.

5. The composite anion exchange membrane according to claim 1,
wherein the monomer having an ethylene glycol chain or the monomer having a polyethylene glycol chain is polyethylene glycol diacrylate having a repeating number of ethylene glycol of 8 to 25.

6. The composite anion exchange membrane according to claim 2,
wherein the monomer having an ethylene glycol chain or the monomer having a polyethylene glycol chain is polyethylene glycol diacrylate having a repeating number of ethylene glycol of 8 to 25.

7. The composite anion exchange membrane according to claim 3,
wherein the monomer having an ethylene glycol chain or the monomer having a polyethylene glycol chain is polyethylene glycol diacrylate having a repeating number of ethylene glycol of 8 to 25.

8. The composite anion exchange membrane according to claim 1,
wherein the surface layer is a polymer of a surface layer forming composition which contains the monomer A, the monomer B, and a photopolymerization initiator represented by the following Formula PI-1, and

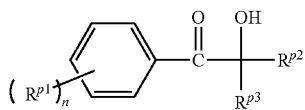

(PI-1)

wherein in Formula PI-1, $R^{p1}$ represents an alkyl group, an alkenyl group, an alkoxy group, or an aryloxy group, $R_{p2}$ and $R^{p3}$ each independently represent a hydrogen atom, an alkyl group, an alkenyl group, an alkoxy group, or an aryloxy group, $R^{p2}$ and $R^{p3}$ are bonded to each other to form a ring, and n represents an integer of 0 to 5.

9. The composite anion exchange membrane according to claim 1,
wherein the surface layer is a polymer of a surface layer forming composition which contains the monomer A, the monomer B, and a photopolymerization initiator represented by the following Formula PI-1, and

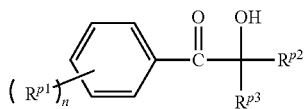

(PI-1)

wherein in Formula PI-1, $R^{p1}$ represents an alkyl group, an alkenyl group, an alkoxy group, or an aryloxy group, $R^{p2}$ and $R^{p3}$ each independently represent a hydrogen atom, an alkyl group, an alkenyl group, an alkoxy group, or an aryloxy group, $R^{p2}$ and $R^{p3}$ are bonded to each other to form a ring, and n represents an integer of 0 to 5.

10. The composite anion exchange membrane according to claim 2,
wherein the surface layer is a polymer of a surface layer forming composition which contains the monomer A, the monomer B, and a photopolymerization initiator represented by the following Formula PI-1, and

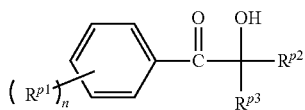

(PI-1)

wherein in Formula PI-1, $R^{p1}$ represents an alkyl group, an alkenyl group, an alkoxy group, or an aryloxy group, $R^{p2}$ and $R^{p3}$ each independently represent a hydrogen atom, an alkyl group, an alkenyl group, an alkoxy group, or an aryloxy group, $R^{p2}$ and $R^{p3}$ are bonded to each other to form a ring, and n represents an integer of 0 to 5.

11. The composite anion exchange membrane according to claim 3,
wherein the surface layer is a polymer of a surface layer forming composition which contains the monomer A, the monomer B, and a photopolymerization initiator represented by the following Formula PI-1, and

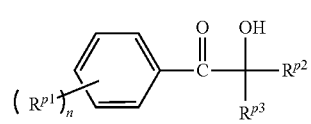

(PI-1)

wherein in Formula PI-1, $R^{p1}$ represents an alkyl group, an alkenyl group, an alkoxy group, or an aryloxy group, $R^{p2}$ and $R^{p3}$ each independently represent a hydrogen atom, an alkyl group, an alkenyl group, an alkoxy group, or an aryloxy group, $R^{p2}$ and $R^{p3}$ are bonded to each other to form a ring, and n represents an integer of 0 to 5.

12. The composite anion exchange membrane according to claim 4,
wherein the surface layer is a polymer of a surface layer forming composition which contains the monomer A, the monomer B, and a photopolymerization initiator represented by the following Formula PI-1, and

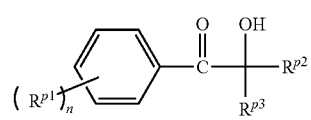

(PI-1)

wherein in Formula PI-1, $R^{p1}$ represents an alkyl group, an alkenyl group, an alkoxy group, or an aryloxy group, $R^{p2}$ and $R^{p3}$ each independently represent a hydrogen atom, an alkyl group, an alkenyl group, an alkoxy group, or an aryloxy group, $R^{p2}$ and $R^{p3}$ are bonded to each other to form a ring, and n represents an integer of 0 to 5.

13. The composite anion exchange membrane according to claim 1,
wherein the surface layer is a polymer of a surface layer forming composition which contains the monomer A and the monomer B and
of which a molar ratio containing the monomer A and the monomer B is monomer A:monomer B=98:2 to 85:15.

14. A method for producing the composite anion exchange membrane according to claim 1, comprising:
coating a single surface or both surfaces of an anion exchange membrane substrate with a surface layer forming composition; and
forming a surface layer by polymerizing the coated surface layer forming composition,
wherein an anion exchange capacity of the surface layer is 0.05 meq/cm$^3$ to 0.50 meq/cm$^3$, and wherein an anion exchange capacity of the anion exchange membrane substrate is 1.0 meq/cm$^3$ to 5.0 meq/cm$^3$.

15. The method for producing a composite anion exchange membrane according to claim 14,
wherein the surface layer forming composition contains a monomer having an ethylene glycol chain or a monomer having a polyethylene glycol chain, and a monomer having a quaternary ammonium group.

16. The method for producing a composite anion exchange membrane according to claim 14,
wherein the polymerization of the coated surface layer forming composition is performed through photopolymerization.

17. The method for producing a composite anion exchange membrane according to claim 14,
wherein a method for producing a composite anion exchange membrane that is used for removing nitrate ions.

18. An ion exchange membrane module comprising:
the composite anion exchange membrane according to claim 1.

19. An ion exchange device comprising:
the composite anion exchange membrane according to claim 1.

* * * * *